US011106536B2

(12) United States Patent
Hall et al.

(10) Patent No.: US 11,106,536 B2
(45) Date of Patent: Aug. 31, 2021

(54) ERROR RECOVERY FOR CONVERSATIONAL SYSTEMS

(71) Applicant: Microsoft Technology Licensing, LLC, Redmond, WA (US)

(72) Inventors: David Leo Wright Hall, Berkeley, CA (US); David Ernesto Heekin Burkett, Berkeley, CA (US); Jesse Daniel Eskes Rusak, Somerville, MA (US); Alexander J. Kolmykov-Zotov, Sammamish, WA (US); Jason Andrew Wolfe, Berkeley, CA (US); Jacob Daniel Andreas, San Francisco, CA (US); Adam David Pauls, San Francisco, CA (US); John Philip Bufe, III, Somerville, MA (US); Jayant Sivarama Krishnamurthy, Berkeley, CA (US); Daniel Louis Klein, Orinda, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 16/520,211

(22) Filed: Jul. 23, 2019

(65) Prior Publication Data
US 2021/0026735 A1    Jan. 28, 2021

(51) Int. Cl.
*G10L 15/22* (2006.01)
*G06F 11/14* (2006.01)
*G06F 16/332* (2019.01)

(52) U.S. Cl.
CPC ...... *G06F 11/1407* (2013.01); *G06F 11/1492* (2013.01); *G06F 16/3329* (2019.01); *G10L 15/22* (2013.01); *G10L 2015/223* (2013.01)

(58) Field of Classification Search
CPC .... G10L 15/22–15/228; G10L 15/1518; G06F 11/1407; G06F 11/1492; G06F 16/3329
(Continued)

(56) References Cited

U.S. PATENT DOCUMENTS 5,918,222 A * 6/1999 Fukui ............... G06Q 10/10
6,510,411 B1 * 1/2003 Norton ............ H04M 3/4936
                                                    379/76

(Continued)

OTHER PUBLICATIONS

"International Search Report and Written Opinion Issued in PCT Application No. PCT/US20/034606", dated Sep. 23, 2020, 10 Pages.

(Continued)

*Primary Examiner* — Abul K Azad
(74) *Attorney, Agent, or Firm* — Alleman Hall Creasman & Tuttle LLP

(57) ABSTRACT

A method, comprising recognizing a user utterance for processing. The method further comprises using a previously-trained code-generation machine to generate, from the user utterance, a data-flow program configured to produce a return value upon successful execution. The method further comprises beginning execution of the data-flow program. Responsive to reaching an error condition resulting from execution of the data-flow program, the method further comprises, prior to the data-flow program producing the return value, suspending execution of the data flow program. The method further comprises using the previously-trained code-generation machine to generate an error-handling data-flow program, wherein the error-handling data-flow program is configured to produce the return value; beginning execution of the error-handling data-flow program to produce the return value; and outputting the return value.

20 Claims, 17 Drawing Sheets

(58) Field of Classification Search
USPC .......................................................... 704/275
See application file for complete search history.

(56) References Cited

U.S. PATENT DOCUMENTS

| | | |
|---|---|---|
| 10,127,908 B1 | 11/2018 | Deller et al. |
| 2003/0105634 A1 | 6/2003 | Abella et al. |
| 2014/0257792 A1 | 9/2014 | Gandrabur et al. |
| 2014/0365216 A1 | 12/2014 | Gruber et al. |
| 2015/0066479 A1* | 3/2015 | Pasupalak ............... G06F 40/40 704/9 |
| 2015/0279366 A1* | 10/2015 | Krestnikov ............. G10L 15/22 704/235 |
| 2016/0155445 A1 | 6/2016 | Selfridge et al. |
| 2018/0260680 A1 | 9/2018 | Finkelstein et al. |
| 2019/0005138 A1* | 1/2019 | Andreica ................ G10L 13/00 |
| 2019/0066660 A1 | 2/2019 | Liang et al. |
| 2021/0027771 A1* | 1/2021 | Hall .......................... G06F 8/36 |

OTHER PUBLICATIONS

"International Search Report and Written Opinion Issued in PCT Application No. PCT/US20/035491", dated Sep. 1, 2020, 13 Pages.
Priya, et al., "A Deep Dive into Automatic Code Generation Using Character Based Recurrent Neural Networks", In Proceedings of the International Conference on Computational Science and Computational Intelligence, Dec. 14, 2017, pp. 369-374.
"Non Final Office Action Issued in U.S. Appl. No. 16/520,229", dated Apr. 27, 2021, 12 Pages.

* cited by examiner

FIG. 1E

CONTEXT-SPECIFIC DIALOGUE HISTORY 130

CONCEPT 130A

CONCEPT 130B

⋮

CONCEPT 130N

USER UTTERANCE 102'

"When is my next meeting with Tom Jones?"

DATA-FLOW PROGRAM 106'

```
[events] = Find(Event(attendees: includes(Person(name: "Tom Jones"))))
[time] = [events][0].start
describe([time])
```

RESPONSE 120'

CONTEXT-SPECIFIC DIALOGUE HISTORY 130

CONCEPT 334

PREVIOUS USER UTTERANCE 304
"When is my next meeting with Tom Jones?"

CONCEPT 324

DATA-FLOW PROGRAM FRAGMENT 326

```
[events] = Find(Event(attendees: includes(Person(name: "Tom Jones"))))
[time] = [events][0].start
describe([time])
```

⋮

CONCEPT 130N

---

USER UTTERANCE 302

"What's after that?"

---

DATA-FLOW PROGRAM 322

```
[time2] = getSalient(Time())
[events2] = Find(Event(start: after(Execute[time2]))
Describe([events2])
```

---

RESPONSE 330

"After the meeting with Tom, you have a meeting with Richard Brown, starting at 1:30."

FIG. 3C

CONTEXT-SPECIFIC DIALOGUE HISTORY 130

CONCEPT 350A →Tom Jones

CONCEPT 350B →Jane Smith

CONCEPT 306

DATA-FLOW PROGRAM 308

```
[r1] = getSalient(Person("him"))
[r2] = ScheduleMeeting(time: 2:30, invitee:[r1])
```

USER UTTERANCE 302"

"Invite Jane instead."

DATA-FLOW PROGRAM 322"

```
[designated] = getSalient(Event())
[replacementTarget] = Event().invitee
[replacing] = getSalient(Person("Jane"))
[newComp0] = Clobber(designated=[designated],
replacementTarget=[replacementTarget], replacing=[replacing])
```

RESPONSE 360'

"OK, inviting Jane Smith to the 2:30 meeting."

FIG. 5A

CONTEXT-SPECIFIC DIALOGUE HISTORY 130

CONCEPT 540A

CONCEPT 540B

⋮

CONCEPT 540C

---

USER UTTERANCE 502

"Who is Dan's manager?"

---

DATA-FLOW PROGRAM 522

```
[r1] = Find(Person(name: like("Dan"))).results.singleton()
[r2] = FindManager(person: [r1])
describe([r2])
```

---

ERROR CONDITION 532

```
Event: [error] = AmbiguousError(intension: intensionOf[r1],
            candidates: List(<Dan A>, <Dan B>)
        describe([error])
```

---

RESPONSE 534

"Did you mean Dan A or Dan B?"

FIG. 5B

CONTEXT-SPECIFIC DIALOGUE HISTORY 130

CONCEPT 520

DATA-FLOW PROGRAM 522

```
[r1] = Find(Person(name: like("Dan"))).results.singleton()
[r2] = FindManager(person: [r1])
describe([r2])
```

CONCEPT 530

ERROR CONDITION 532

```
Event: [error] = AmbiguousError(intension: intensionOf[r1],
            candidates: List(<Dan A>, <Dan B>)
describe([error])
```

⋮

CONCEPT 540

USER UTTERANCE 502'

"Dan A"

DATA-FLOW PROGRAM 552

```
[r3] = getSalient(Person(name: like("Dan A")))
[r4] = [error].intension
[newComp1] = Clobber(designated: intensionOf([r2]), replaceTarget:
[r4], replacing: [r3])
[r2'] = Execute([newComp1])
describe([r2'])
```

RESPONSE 514

"Dan's manager is Tom Jones."

FIG. 5C

| USER UTTERANCE 504 |
|---|
| "Schedule a meeting at 12:30 with Dan and Tom." |

| RESPONSE 534' |
|---|
| "Did you mean Dan A or Dan B?" |

| USER UTTERANCE 506 |
|---|
| "Dan A" |

| RESPONSE 536 |
|---|
| "Did you mean Tom J or Tom K?" |

| USER UTTERANCE 508 |
|---|
| "Tom J" |

| RESPONSE 538 |
|---|
| "Meeting with Dan and Tom is scheduled for 12:30." |

FIG. 5D

CONTEXT-SPECIFIC DIALOGUE HISTORY 130

CONCEPT 530A → "Dan A"

CONCEPT 530B → "Tom J"

⋮

CONCEPT 130N

USER UTTERANCE 510

"Please call him to confirm the meeting."

DATA-FLOW PROGRAM 562

```
[r1] = getSalient(Person("him"))
[r2] = DialPhoneNumber(person: [r1])
describe([r2])
```

ERROR CONDITION 534"

```
Event: [error] = AmbiguousError(intension: intensionOf[r1],
        candidates: List(<Dan A>, <Tom J>)
        describe([error])
```

RESPONSE 536"

"Did you mean Dan A or Tom J?"

USER UTTERANCE 512

"I meant Dan A."

RESPONSE 538"

"Dialing Dan A now..."

FIG. 5E

| CONTEXT-SPECIFIC DIALOGUE HISTORY 130 |
|---|

| USER UTTERANCE 524 |
|---|
| "Please call him to confirm the meeting." |

```
                    DATA-FLOW PROGRAM 526

[r1] = getSalient(Person("him"))
[r2] = DialPhoneNumber(person: [r1])
describe([r2])
```

```
                    ERROR CONDITION 534'''

Event: [error] = NoMatchError(intension: intensionOf[r1])
                         describe([error])
```

| RESPONSE 582 |
|---|
| "Who did you want to call?" |

| USER UTTERANCE 516 |
|---|
| "I meant Dan A." |

| RESPONSE 584 |
|---|
| "Dialing Dan A now..." |

FIG. 5F

USER UTTERANCE 518

"Please schedule a ride to the meeting."

---

DATA-FLOW PROGRAM 562

[r1] = getSalient(Meeting())

[r2] = FindRideHailingService(location: [r1].location, time:Now())

[r3] = ScheduleRideHailingService([r2])

describe([r3])

---

ERROR CONDITION 554

Event: [error] = ConfirmationNeeded(intension: intensionOf[r3])

describe([error])

---

RESPONSE 556

"I found a ride costing $20. Schedule now?"

---

USER UTTERANCE 520

"Yes please."

---

RESPONSE 558

"Scheduling your ride now..."

ERROR RECOVERY FOR CONVERSATIONAL SYSTEMS

BACKGROUND

Conversational systems process user utterances and respond by automatically performing actions, such as answering questions, invoking application programming interfaces (APIs), or otherwise assisting a user based on the user utterances. conversational systems are limited to processing a pre-defined set of hard-coded templates, which limits the actions that can be performed by the automated assistant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method comprises recognizing a user utterance for processing. The method further comprises using a previously-trained code-generation machine to generate, from the user utterance, a data-flow program configured to produce a return value upon successful execution. The method further comprises beginning execution of the data-flow program. Responsive to reaching an error condition resulting from execution of the data-flow program, the method further comprises: prior to the data-flow program producing the return value, suspending execution of the data flow program. The method further comprises using the previously-trained code-generation machine to generate an error-handling data-flow program, wherein the error-handling data-flow program is configured to produce the return value; beginning execution of the error-handling data-flow program to produce the return value; and outputting the return value.

BRIEF DESCRIPTION OF THE DRAWINGS

FIG. 1E shows an exemplary dialogue between a user and an automated assistant.

FIGS. 3A-3C show exemplary user utterances including ambiguities and corresponding data-flow programs for processing the exemplary user utterances.

FIGS. 5A-5F show exemplary user utterances, corresponding data-flow programs for processing the exemplary user utterances that may result in errors, and alternative data-flow programs for resolving the errors.

DETAILED DESCRIPTION

Figure 1A:
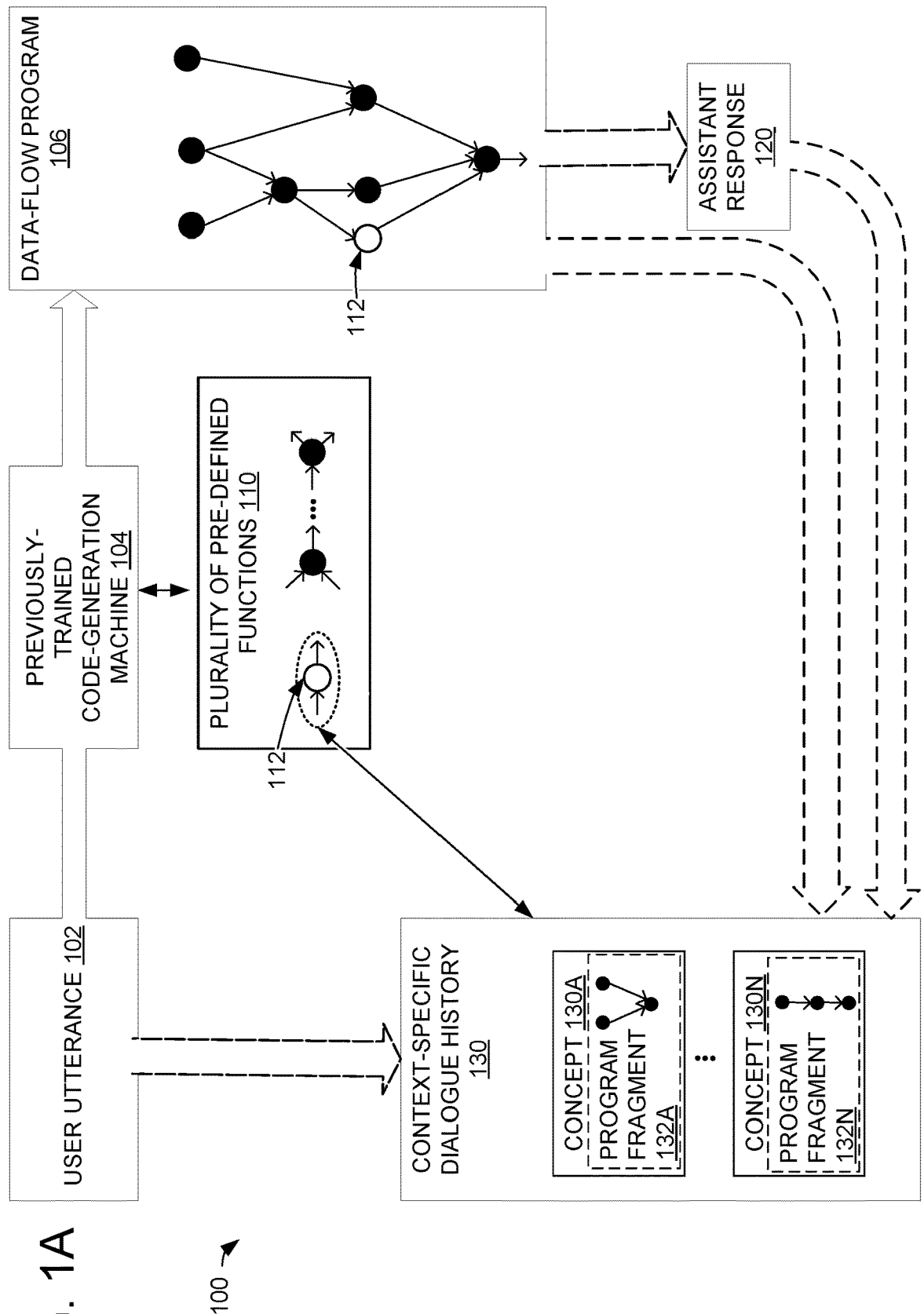
FIGS. 1A-1D show an exemplary data-flow architecture for an automated assistant.

Conversational computing interfaces may be used to interact with users via natural language, for example via speech and/or submitted text. As an example, automated assistants may be used to assist users via natural language interactions. Although the present disclosure uses an automated assistant as an example conversational computing interface, this example is non-limiting and conversational computing interfaces may be implemented according to the present disclosure for any suitable purpose, for example, to permit a user to use natural language to interact with any suitable computer hardware and/or computer software. As such, every reference to an automated assistant in the present disclosure applies equally to any other conversational computer interface or other computing framework configured to respond to speech or text input.

Automated assistants can use natural language processing (NLP) techniques (e.g., machine learning classifiers) to process an input user utterance (e.g., user speech and/or submitted text) in order to perform a predefined, hard-coded action related to the input user utterance. For example, an automated assistant may support a predefined plurality of hard-coded templates, where each template has a number of slots that can be filled to parametrize a hard-coded action. As an example, an automated assistant may support a predefined interaction to invoke an application programming interface (API), e.g., to reserve a seat at a restaurant, call a ride-hailing service, or look up the weather. However, although automated assistants may support a plurality of different predefined actions via the predefined templates, an automated assistant that only supports predefined actions via templates may not be configured to perform more complex or novel behaviors.

The present disclosure is directed to an automated assistant that processes user utterances using data-flow programs in a data-flow programming language (e.g., in addition to or instead of using templates). The automated assistant uses a previously-trained code generation machine to generate and/or output a data-flow program for a user utterance, wherein the data-flow program uses a plurality of pre-defined functions to define individual steps for processing the user utterance.

Processing user utterances by using data-flow programs generated by a previously-trained code generation machine may result in an improved user experience, improved efficiency of an automated assistant or other interactive computer service (e.g., improved storage usage and/or improved processing time), and/or improved ability for responding to different user utterances. As an example, the data-flow programs may encode a variety of different processing strategies for different user utterances, including performing calculations based on the user utterances, accessing APIs to respond to the user utterances, etc. The code generation machine may generate data-flow programs that are specific to a user utterance being processed, which may enable processing the user utterance more efficiently (e.g., without performing irrelevant steps) and with improved user satisfaction (e.g., by generating programs that better address requests expressed in the user utterance). Furthermore, a data-flow program that encounters one or more errors may be suspended in order to handle the errors with an error-recovery program, for example with a modified version of the data-flow program or with an alternative data-flow program. As such, an approach that uses the previously-trained code generation machine and data-flow programs may be more robustly applicable in different situations where errors may occur, since different types of errors may be handled by executing error-recovery data-flow programs.

Accordingly, FIG. 1A shows a data-flow architecture for an automated assistant system 100. Automated assistant system 100 is configured to process a user utterance 102 by operating a previously-trained code-generation machine 104 configured to output a data-flow program 106 for the user utterance 102. Although the present disclosure focuses on interaction via natural language (e.g., speech and submitted text), conversational computing interfaces such as automated assistant system 100 may further permit interaction via any other suitable input methods, for example, via touch screen inputs and/or button presses. Similarly, although the present disclosure focuses on processing a user utterance 102, other inputs such as button press events may be processed in similar fashion. For example, previously-trained code-generation machine 104 may be configured to output a data-flow program 106 for one or more button press event(s). Previously-trained code generation machine 104 may be trained to recognize different kinds of non-linguistic input events, e.g., based on a specific button being pressed, timing of the button press relative to other input events, etc.

Data-flow program 106 is shown as a graph including a plurality of function nodes, wherein the function nodes are depicted with inputs and outputs shown by arrows. The data-flow program is configured to produce a return value indicated by the bottom-most arrow. Previously-trained code-generation machine 104 is configured to add any of a plurality of pre-defined functions 110 to the data-flow program based on the user utterance. Each pre-defined function defines one or more individual steps for processing the user utterance 102. The data-flow program 106 is executable to cause the automated assistant to respond to the user utterance, for example by performing any suitable response action. The pre-defined functions of the data-flow program 106 may be executable to cause the automated assistant to perform any suitable response action, for example, outputting a response as speech and/or text (e.g., outputting an assistant response 120 as shown in FIG. 1A), invoking an API to perform an action using the API (e.g., ordering food from a restaurant, scheduling a ride with a ride-hailing service, scheduling a meeting in a calendar service, placing a phone call). Although the present disclosure focuses on examples in which the automated assistant responds to utterances by outputting an assistant response (e.g., as speech and/or text), these examples are non-limiting and the pre-defined functions and data-flow programs described herein may be configured to cause the automated assistant to respond to utterances in any suitable manner, for example by performing one or more actions using an API instead of or in addition to outputting an assistant response.

The previously-described code-generation machine 104 described herein may be used to respond to user utterances in any suitable fashion. For example, the previously-described code-generation machine 104 may be configured to recognize a user utterance, and produce, from the user utterance, a data-flow program that defines an executable plan for responding to the user utterance. The resulting data-flow program may be executed, for example by an automated assistant, to process the user utterance. In some examples, the data-flow program for responding to the user utterance may be executed to respond to the user utterance without needing to generate any additional code using the code-generation machine 104. In other words, code-generation machine 104 is configured to output a complete plan for processing a user utterance. Alternately or additionally, code-generation machine 104 may be configured to output a data-flow program for responding a user utterance, wherein some or all of the data-flow program is executed before code-generation machine 104 is used to generate further code defining a further plan for completing processing of the user utterance. Code-generation machine 104 may be used to plan and execute data-flow programs in any suitable fashion, including completing planning before execution and/or interleaving planning and execution in any suitable fashion.

The previously-trained code-generation machine 104 may be based on any suitable technology, such as state-of-the-art or future machine learning (ML), artificial intelligence (AI), and/or natural language processing (NLP) technologies. In some examples, the previously-trained code-generation machine 104 includes an encoder machine configured to encode the user utterance 102 as a semantic feature (e.g., a vector in a semantic vector space learned by the previously-trained code-generation machine 104) and a decoder machine configured to decode the semantic feature by outputting one or more functions from the plurality of pre-defined functions 110. In some examples, the decoder machine is configured to output the one or more functions according to a typed grammar for composing functions from the plurality of pre-defined functions 110, thereby constraining the outputs of the decoder machine to be well-typed, fully-executable data-flow programs. The plurality of pre-defined, composable functions 110 supports a range of different automated assistant behaviors, e.g., invoking APIs, answering questions, looking up user data, and/or utilizing historical context from a context-specific dialogue history 130 maintained for the automated assistant. As shown by the dashed arrows in FIG. 1A, the context-specific dialogue history 130 may include any suitable aspects of the dialogue, for example user utterance 102, data-flow program 106, and/or a resulting assistant response 120.

Accordingly, the user utterance 102, data-flow program 106 generated for the user utterance 102, and/or any relevant assistant response 120 by the automated assistant may be stored in the context-specific dialogue history 130. Accordingly, the context-specific dialogue history 130 defines a plurality of concepts (e.g., concept 130A, and any suitable number of concepts including concept 130N). "Concept" is used herein to refer to any relevant or potentially relevant aspects of the interaction between the user and the automated assistant. For example, a concept may include an entity (e.g., a person, place, thing, number, date), an intent of a user query (e.g., an intent to order food, an intent to look up the weather, an intent to schedule a meeting), an action performed by the automated assistant (e.g., ordering food, looking up the weather, invoking an API, looking up information pertaining to an entity, recognizing a specific user utterance, performing a composite action composed of more than one action), or any other suitable feature. A concept may be defined in any suitable manner, for example based on text content of the user utterance 102. In some examples, a concept 130A is defined in terms of a data-flow program fragment 132A. For example, the data-flow program fragment 132A may include one or more functions configured to look up information pertaining to a specific entity, and/or one or more functions configured to cause the automated assistant to perform a specific action.

In some examples, the plurality of pre-defined functions 110 includes one or more history-accessing functions configured to access the context-specific dialogue history 130. Accordingly, data-flow program 106 may include such history-accessing functions. For example, the plurality of pre-defined functions 110 and data-flow program 106 each include a history-accessing function 112 configured to access the context-specific dialogue history 130 as shown by the arrow. In some examples, the plurality of pre-defined functions 110 includes a search-history function configured to look up a concept from the context-specific dialogue history 130 (e.g., a getSalient( ) function configured to look up an entity that was previously discussed, or to look up an action that was previously performed), as will be discussed further with regard to FIGS. 1B, 2, and 3A-3F. In some examples, the plurality of pre-defined functions 110 includes a program-rewriting function parametrized by a designated concept stored in the context-specific dialogue history and configured to generate a new data-flow program fragment related to the designated concept based on concepts from context-specific dialogue history 130 (e.g., a Clobber® function configured to generate a new, re-written program based on the designated concept, for example, to write a new program for performing a previous action with regard to a new entity, or for performing a new action with regard to a previously-discussed entity). In some examples, the designated concept stored in the context-specific dialogue history includes a target sub-concept, and the program-rewriting function is further parametrized by a replacing sub-concept for replacing the target sub-concept. Accordingly, the new data-flow program fragment corresponds to the designated concept with the target sub-concept being replaced by the replacing sub-concept. In particular, in some examples, the new data-flow program fragment includes a rewritten data-flow program fragment, based on a historical data-flow program fragment corresponding to the designated concept, wherein a sub-program fragment corresponding to the target sub-concept is replaced by a different sub-program fragment corresponding to the replacing sub-concept. The program-rewriting function will be discussed further with regard to FIGS. 1C, 2, and 3F-3G.

By looking up and/or rewriting concepts from context-specific dialogue history 130, the automated assistant may be able to repeat actions, perform actions with modifications, look up relevant entities or other details related to previous actions, etc. For example, the automated assistant may repeat an action or perform an action with modifications, by re-executing code based on a program fragment 132A corresponding to a concept 130A from the context-specific dialogue history 130. Furthermore, if any error condition is reached during execution of data-flow program 106 prior to outputting an assistant response 120, the data-flow program 106 and/or other program fragments stored in context-specific dialogue history 130 may be re-executed (e.g., with or without modifications) to recover from the error, as will be described further with regards to FIGS. 1D, 4, and 5A-5I1.

Figure 1B:
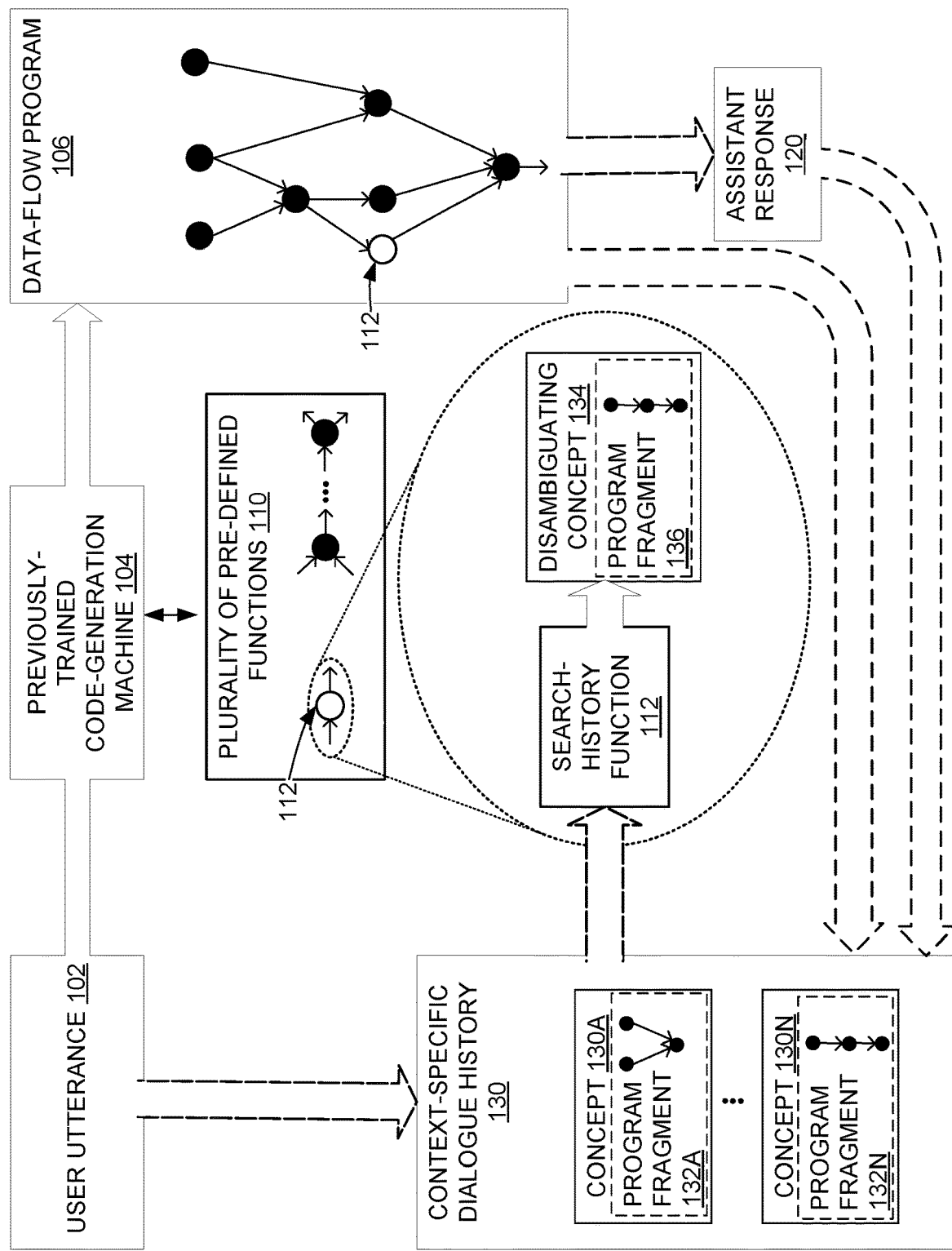

Accordingly, FIG. 1B shows a different view of automated assistant system 100 focusing on a search-history function 112 of the plurality of pre-defined functions 110. The search-history function 112 is configured to process an ambiguous user utterance 102 by resolving any ambiguities using concepts from context-specific dialogue history 130. As shown by the dashed arrow leading from context-specific dialogue history 130 to search-history function 112, search-history function 112 is configured to access one or more concepts from the context-specific dialogue history 130 to determine a disambiguating concept 134.

In some examples, disambiguating concept 134 is defined by a program fragment 136. As an example, if user utterance 102 refers to an ambiguous entity (e.g., by a pronoun or partial name, such as "Tom"), search-history function 112 may be configured to search for the ambiguous entity (e.g., based on the partial name "Tom") in the context-specific dialogue history 130 to find a clarifying entity that matches the ambiguous entity (e.g., an entity having a first name "Tom" or a related name such as "Thomas"). In some examples, the clarifying entity may be defined by a full name (e.g., "Thomas Jones"). In other examples, the clarifying entity may be defined by code configured to find the clarifying entity (e.g., code to lookup people named "Tom" in an address book of the user).

In some examples, disambiguating concept 134 indicates a bridging anaphora between a user utterance and a previous user utterance from the context-specific dialogue history. As an example, if a user asks, "when is my lunch with Charles?" and then subsequently asks, "how long will it take to get there?" the word "there" in the subsequent user utterance refers to the location of the lunch with Charles. Accordingly, search-history function 112 may be configured to search for a concept corresponding to the location of the lunch with Charles. For example, the concept may include a data-flow program fragment that recursively uses the search-history function 112 to find a salient event, namely the meeting with Charles, as well as further instructions to obtain the location of the salient event. More generally, concepts found by the search-history function 112 may include data-flow programs that recursively invoke the search-history function 112 to find any suitable sub-concepts, e.g., so that a salient concept is defined in terms of searching for other salient sub-concepts.

The search-history function 112 will be described further with regards to FIGS. 2 and 3A-3C.

Figure 1C:
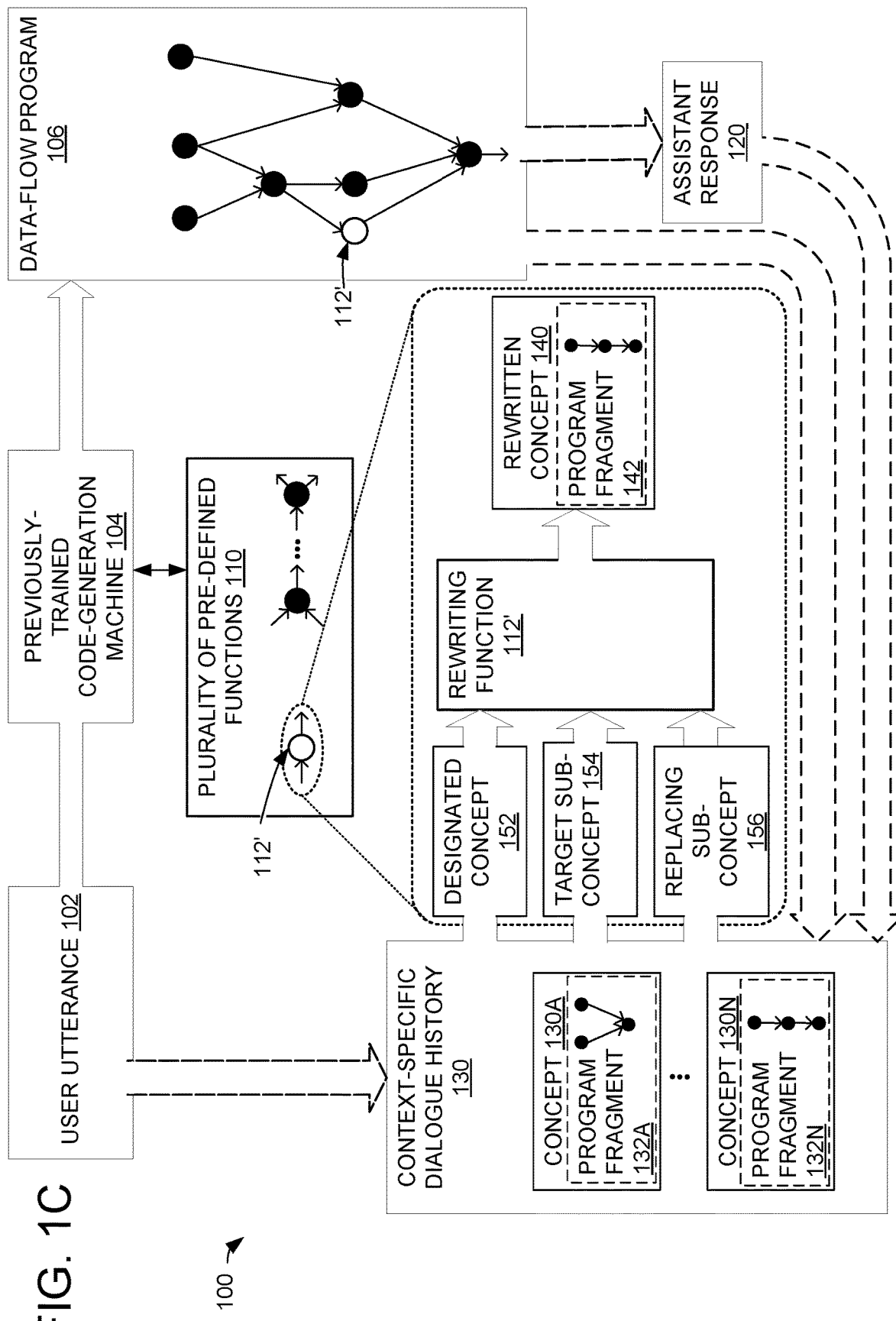

FIG. 1C shows another different view of automated assistant system 100 focusing on a program-rewriting function 112'. Program-rewriting function 112' is configured to produce a rewritten concept 140 (e.g., defined by a rewritten program fragment 142) by starting with a designated concept 152 from the context-specific dialogue history 130, wherein the designated concept 152 includes at least one replacement target sub-concept 154 to be modified/replaced with a different, replacing sub-concept 156. As an example, designated concept 152 may refer to an action by the automated assistant including "placing a reservation at a local sushi restaurant". Accordingly, target sub-concept 154 may be the description "sushi restaurant," and the replacing sub-concept 156 may be an alternate description "burrito restaurant." In particular, designated concept 152 may be defined by a program fragment for invoking an API to place restaurant reservations, wherein the API is parametrized by a program fragment corresponding to target sub-concept 154 that indicates a restaurant at which to place reservations. Accordingly, program-rewriting function 112' is configured to output a re-written concept 140 that corresponds to "placing a reservation at the local burrito restaurant," so that re-written concept 140 may be used to perform a new action consisting of placing the reservation at the local burrito restaurant (e.g., by executing program fragment 142). The program-rewriting function 112' will be described further with regards to FIGS. 2 and 3C.

Figure 1D:
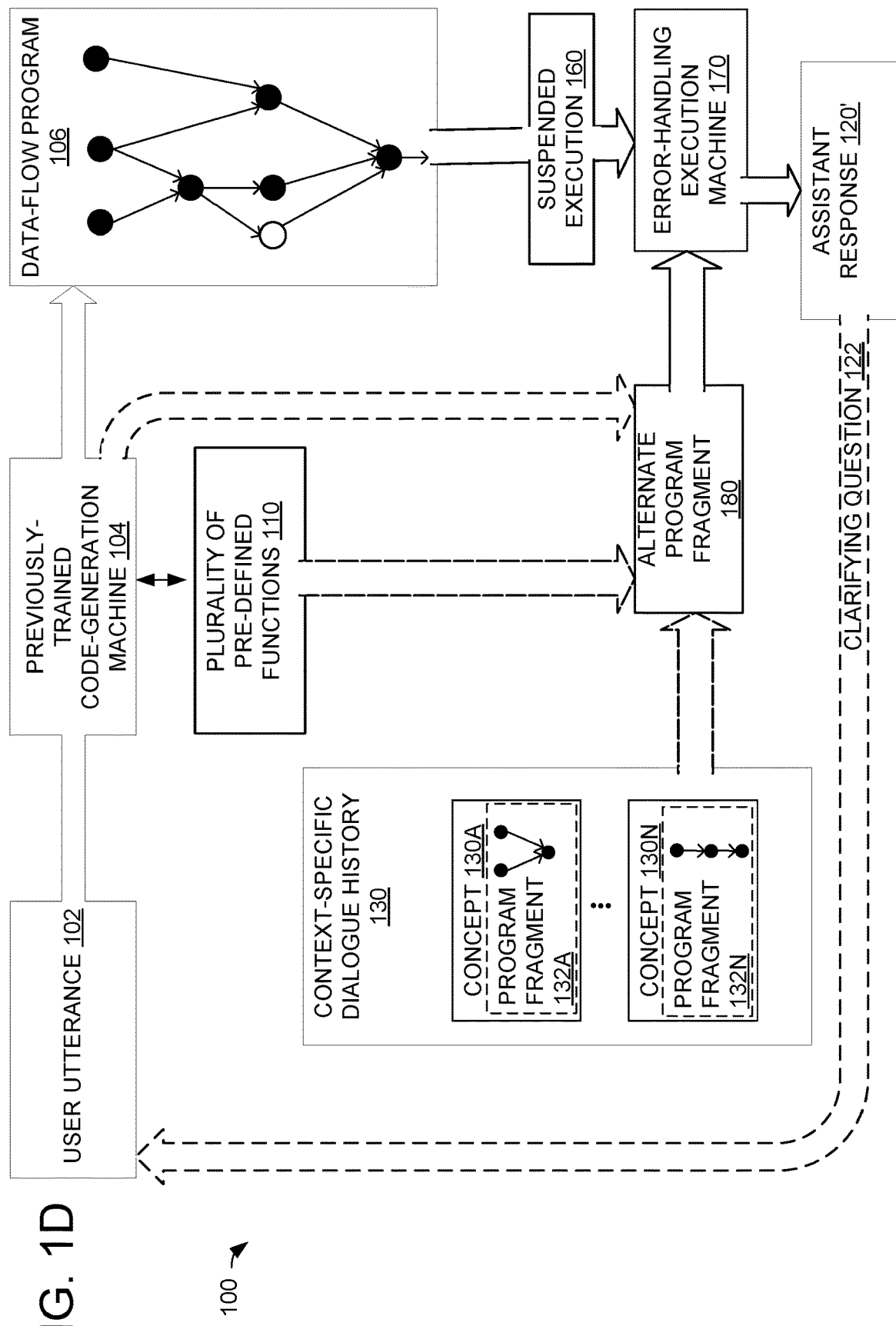

FIG. 1D shows another view of automated assistant system 100 focusing on handling errors that may arise during execution of data-flow program 106. Although not shown in FIG. 1D, as in FIGS. 1A-1C, the user utterance 102, data-flow program 106 and/or assistant response 120 may be stored into context-specific dialogue history 130 while processing user utterances.

If an error condition is reached during execution of data-flow program 106 prior to outputting an assistant response 120, then the data-flow program may be suspended and saved as suspended execution 160. Error-handling execution machine 170 is configured to recover from the error condition in order to produce the assistant response 120'. For example, error-handling execution machine 170 may implement method 400, which is described with regard to FIG. 4, below. To recover from the error condition, error-handling execution machine 170 may modify and/or re-execute the suspended execution 160. Alternately or additionally, error-handling execution machine 170 may execute an alternate program fragment 180. For example, error-handling execution machine 170 may modify the suspended execution 160 by using a program-rewriting function to replace a program fragment of the data-flow program 106 with the alternate program fragment 180, and/or by executing the alternate program fragment instead of the data-flow program 106. The alternate program fragment 180 may be derived from the context-specific dialogue history 130 (e.g., the alternate program fragment 180 may be a previously-executed program fragment), built from the plurality of pre-defined functions 110 and/or output by the previously-trained code-generation machine 104. In some examples, previously-trained code-generation machine 104 is configured to recognize the error condition and to output a new program fragment configured to recover from the error. For example, previously-trained code-generation machine 104 may be trained with regard to one or more training examples, each training example including an exemplary error condition, and an exemplary data-flow program fragment for responding to the error. For example, previously-trained code-generation machine 104 may be trained with regard to a large plurality of annotated dialogue histories (as will be described below), where some or all of the annotated dialogue histories include an occurrence of an error condition.

In some examples, the error condition may arise due to an ambiguity in the user utterance 102 in which insufficient information is provided by the user utterance 102 to fully serve the user based on the user utterance. As an example, if the user utterance is "Schedule a meeting with Tom" but there is more than one "Tom" in the user's address book, it may not be clear with whom to schedule the meeting. Accordingly, in some examples, error-handling execution machine 170 is configured to execute code to produce an initial assistant response 120' including a clarifying question 122. The clarifying question 122 is output for the user to respond to in a new, clarifying user utterance 102. Accordingly, the clarifying user utterance can be processed using the previously-trained code-generation machine 104 to produce a new data-flow program 106 for responding to the clarifying user utterance. Error recovery, including clarifying questions, is discussed further below with regard to FIGS. 4 and 5A-5H. The previously-trained code-generation machine 104 may be trained via supervised training on a plurality of annotated dialogue histories. In many examples, the previously-trained code-generation machine 104 is trained on a large plurality of annotated dialogue histories (e.g., hundreds, thousands, tens of thousands or more). Annotated dialogue histories describe state information associated with a user interacting with an automated assistant, annotated with an exemplary data-flow program for responding to the user interaction. For example, an annotated dialogue history may include a context-specific dialogue history according to the present disclosure (as described with regard to FIGS. 3A-3C and 5A-5F below), annotated with an exemplary data-flow program suitable for execution by the automated assistant in response to the context established in the context-specific dialogue history. In examples, a context-specific dialogue history includes a plurality of events arranged in a temporal order (e.g., time-stamped events), including user utterances, data-flow programs executed by an automated assistant, responses output by the automated assistant, and/or error conditions reached while executing data-flow programs.

As a non-limiting example, an annotated dialogue history may include a context-specific dialogue history in which the most recent event is an exemplary user utterance, annotated with an exemplary data-flow program for responding to the exemplary user utterance with regard to the context established by the context-specific dialogue history. Accordingly, the previously-trained code-generation machine 104 may be trained to reproduce the exemplary data-flow program given the exemplary user utterance and the context-specific dialogue history. The exemplary data-flow program may include any suitable functions in any suitable sequence/arrangement, so that via training, the code-generation machine is configured to output suitable functions in a suitable sequence. For example, the exemplary data-flow program may include the search-history function and accordingly, the code-generation machine may be trained to output the search-history function along with other functions in a suitable sequence for responding to a user utterance (e.g., to cause an automated assistant to perform any suitable response action, such as outputting a response as text and/or speech, or invoking an API). In some examples, an annotated dialogue history includes a context-specific dialogue history in which the most recent event is the occurrence of an error condition (e.g., instead of a user utterance being the most recent event), annotated with a data-flow program for recovering from the error. Accordingly, the previously-trained code-generation machine 104 may be trained with regard to such annotated dialogue histories to generate suitable data-flow programs for recovering from error conditions.

Annotated dialogue histories may be obtained in any suitable manner, for example, from human demonstrators. For example, one or more human demonstrators may be shown context-specific dialogue histories (e.g., context-specific dialogue histories derived from usage data obtained from interaction with humans, and/or machine-generated context-specific dialogue histories), and for each context-specific dialogue history, be asked to provide a suitable data-flow program for responding to the context-specific dialogue history. The data-flow programs provided by the human demonstrators may use the pre-defined functions in any suitable manner to perform a wide range of tasks responsive to user utterances and/or error conditions.

For example, based on being shown an exemplary user utterance or an exemplary error condition, the human demonstrators may provide exemplary data-flow programs that perform any suitable calculations, output responses (e.g., to ask clarifying questions of the user, or answer a query issued by the user), listen for utterances from a user (e.g., to obtain clarifications from the user), invoke APIs, etc. Furthermore, the exemplary data-flow programs may include the search-history function (e.g., "getSalient( )") and/or program-rewriting function (e.g., "Clobber( )"), invoked with any suitable parameters, for example, to execute data-flow program fragments from the context-specific dialogue history. Accordingly, by training on a plurality of annotated dialogue histories, the code-generation machine 104 may be trained to generate data-flow programs similar to those provided by the human demonstrators, in order to respond to user utterances and/or recover from errors.

The data-flow programs (e.g., data-flow programs generated by the previously-trained code generation machine and/or exemplary data-flow programs) are built from a plurality of pre-defined, composable functions. The pre-defined, composable functions may be composed into programs that invoke the pre-defined, composable functions in in any suitable order and parametrize the pre-defined, composable functions in any suitable fashion. Accordingly, the previously-trained code-generation machine may be trained to output suitable data-flow programs for a user utterance, based on the exemplary data-flow programs provided during training. The previously-trained code-generation machine is not limited to hard-coded behaviors. For example, instead of or in addition to responding to exemplary user utterances seen during training, the previously-trained code-generation machine is configured to process novel user utterances (that may not have been provided during training) by generating corresponding, novel data-flow programs (that also may not have been provided during training).

In order to generalize from specific training examples seen during training and respond to novel user utterances with novel data-flow programs, the previously-trained code-generation machine may be trained in any suitable fashion (e.g., using any suitable ML, AI, and/or NLP models as will be described below with regard to FIG. 6, on any suitable training data, for example, a large plurality of annotated dialogue histories). In some examples, the previously-trained code-generation machine may be trained with regard to a loss function for assessing whether a data-flow program is a suitable response to a user utterance, wherein the loss function is configured to indicate zero loss or a relatively small loss (e.g., requiring no adjustment, or a relatively smaller adjustment of training parameters) when the code-generation machine successfully reproduces a training example (e.g., by producing the same data-flow program as was provided by a human annotator, given a context-specific dialogue history). However, although the loss function may be configured for a relatively small loss when the code-generation machine successfully reproduces a training example, the loss function may also be configured for a relatively small loss when the code-generation machine reproduces a different data-flow program, for example, a data-flow program that has a similar effect when executed, and/or a data-flow program that is indicated to be satisfactory by a human user (e.g., a human demonstrator and/or end-user of an automated assistant device). These exemplary approaches for generalization during training are non-limiting, and any suitable AI, ML, and/or NLP techniques may be utilized to suitably train a code-generation machine to generate suitable data-flow programs in response to a wide variety of user utterances.

In some examples, error conditions may be recognized by operating a previously-trained error detection model. For example, the previously-trained error detection model may be trained via supervised training on a plurality of annotated dialogue histories, wherein the annotated dialogue histories are annotated to indicate when errors occur. For example, the annotated dialogue histories may be obtained by showing context-specific dialogue histories to one or more human demonstrators and asking the human demonstrators to indicate when the context-specific dialogue histories indicate an erroneous state.

In addition to history-accessing functions such as a search-history function and a program-rewriting function, the plurality of pre-defined composable functions may include any suitable functions, for example, a listen function configured to listen for a specific user utterance before continuing with execution of a data-flow program, a response function configured to output a description of a value determined during execution of a data-flow program, and/or a primitive calculation function for processing values obtained from user utterances and/or computed during execution of the data-flow program (e.g., data structure operations such as forming tuples from data, or arithmetic operations).

In some examples, the plurality of pre-defined composable functions includes a foreign function configured to invoke a foreign (i.e., third party) API. For example, foreign APIs may be invoked to interact with real-world services (e.g., schedule a car in a ride-hailing service, order food or make reservation at a restaurant). In some examples, the plurality of pre-defined composable functions includes an inference function configured to perform a calculation with regard to a result of a foreign function. The inference function may encapsulate high-level behaviors with regard to the API, which would otherwise require multiple different low-level functions using the API. For example, a foreign ride-hailing API may support functions for scheduling a car, adding a stop to a route, and finalizing a scheduled route. Accordingly, an inference function may be configured to receive a destination and, based on the destination, schedule a car, add a stop corresponding to a pickup location for the user, add a stop corresponding to the destination, and finalize the scheduled route including the stops corresponding to the pickup location and destination. By using inference functions to encapsulate high-level behaviors, the code-generation machine may be able to readily output well-typed code for performing the high-level behaviors using a foreign API, without needing to output individual steps using low-level functions of the foreign API. In some examples, an inference function may be defined with regard to one or more constraints and executing the inference function may include running a constraint satisfaction program to satisfy the one or more constraints, before invoking a foreign API using parameters defined by the solution for the constraints. In some examples, the one or more constraints may include "fuzzy" or "soft" constraints and accordingly, solving the constraints may include executing an inference program suitable for "fuzzy" logical inference, for example a Markov logic inference program.

In some examples, the plurality of pre-defined composable functions includes a user-customized function that is configured to access a user customization setting and to perform a calculation based on the user customization setting. For example, the user-customized function may be configured to determine whether the user is free based on a user-customized schedule, e.g., calendar data. User-customized functions may be implemented using foreign functions configured to invoke a foreign API, e.g., an API for looking up calendar data.

In some examples, the plurality of pre-defined composable functions includes an intelligent decision function, wherein the intelligent decision function is configured to use a previously-trained machine learning model to perform a calculation. As an example, the search-history function may be an intelligent decision function configured to use a previously-trained relevance detection machine to search the context-specific dialogue history. As another example, the plurality of pre-defined composable functions may include an intelligent decision function configured to assess whether it is "morning" in a user-specific and/or population-specific way, e.g., the function may be configured to recognize that what time the user considers "morning" could vary depending on the day of the week or time of the year. For example, the intelligent decision function may be configured to assess that it is "morning" if it is between 6 AM and 11 AM on a weekday, but may be configured to assess that it is morning if it is between 9 AM and 12 PM on a weekend. The intelligent decision function may be trained in any suitable fashion, for example based on labeled examples of times and whether or not a user considers the time morning. As with user-customized functions, the intelligent decision function may take into account auxiliary information such as a work schedule, calendar, and/or mobile phone usage of a user, for example to determine if it is "morning" based on whether the user has likely woken up yet on a given day. In some examples, an intelligent decision function may be configured to assess an ambiguity (e.g., an ambiguous user utterance, or an ambiguous constraint) and select a disambiguating data-flow program to respond to the ambiguity.

In some examples, the plurality of pre-defined composable functions includes a macro function, wherein the macro function includes a plurality of other pre-defined composable functions, and is configured to execute the plurality of other pre-defined composable functions. For example, a macro function can be used to sequence and organize related low-level steps of a high-level task using low-level functions. By using macro functions to encapsulate high-level behaviors, the code-generation machine may be able to readily output well-typed code for performing the high-level behaviors without needing to output individual steps using low-level functions.

Turning briefly to FIG. 1E, FIG. 1E shows a first example of a dialogue between a user and an automated assistant, in which the automated assistant processes a user utterance 102' in which there is no ambiguity. Context-specific dialogue history 130 is shown including concepts 130A,130B, and further concepts through 130N. However, in this example, the user utterance 102' is unambiguous and may be processed without referring to the context-specific dialogue history 130. The user asks, "When is my next meeting with Tom Jones?" and the previously-trained code-generation machine outputs a data-flow program 106'.

Data-flow program 106' is shown with a non-limiting example syntax in which square brackets indicate return values of expressions, e.g., [events] indicates a return value of an expression for finding all events matching a set of criteria, and [time] indicates a start time of the first such event in the set. The example syntax includes various functions including the search-history function (e.g., "getSalient( )") and program-rewriting function (e.g., "Clobber( )") as well as other functions (such as primitive functions, API functions, etc., as described herein). The exemplary functions are shown in a function-call syntax indicating the name of a function (e.g., "Find", "getSalient", "Clobber", among other named functions) and parentheses enclosing parameters for invoking the function. The exemplary function-call syntax is non-limiting, and functions may be invoked and parametrized in any suitable manner (e.g., using any suitable formal-language syntax). The exemplary function names represent pre-defined functions with implementations that are not shown herein. For example, each pre-defined function may be implemented by any suitable sequence of one or more instructions executable by the automated assistant to perform any suitable steps (e.g., to result in behavior indicated by the function name, behavior set forth in this disclosure, and/or any other suitable behavior such as performing calculations, invoking APIs, outputting audio, visually presenting information via a display, etc.). For example, the "Find" function may be implemented in any suitable manner, for example, by invoking an API to look up information stored in a user calendar.

As shown, the data-flow program finds events that have an attendee named "Tom Jones." The data-flow program computes values such as [events] and [time] and then outputs a response 120' using a "describe" function configured to output a description of the value [time], e.g., as speech via a speaker of an automated assistant device. Accordingly, response 120' indicates the meeting time for the next meeting with Tom Jones, namely "at 12:30".

Figure 2:
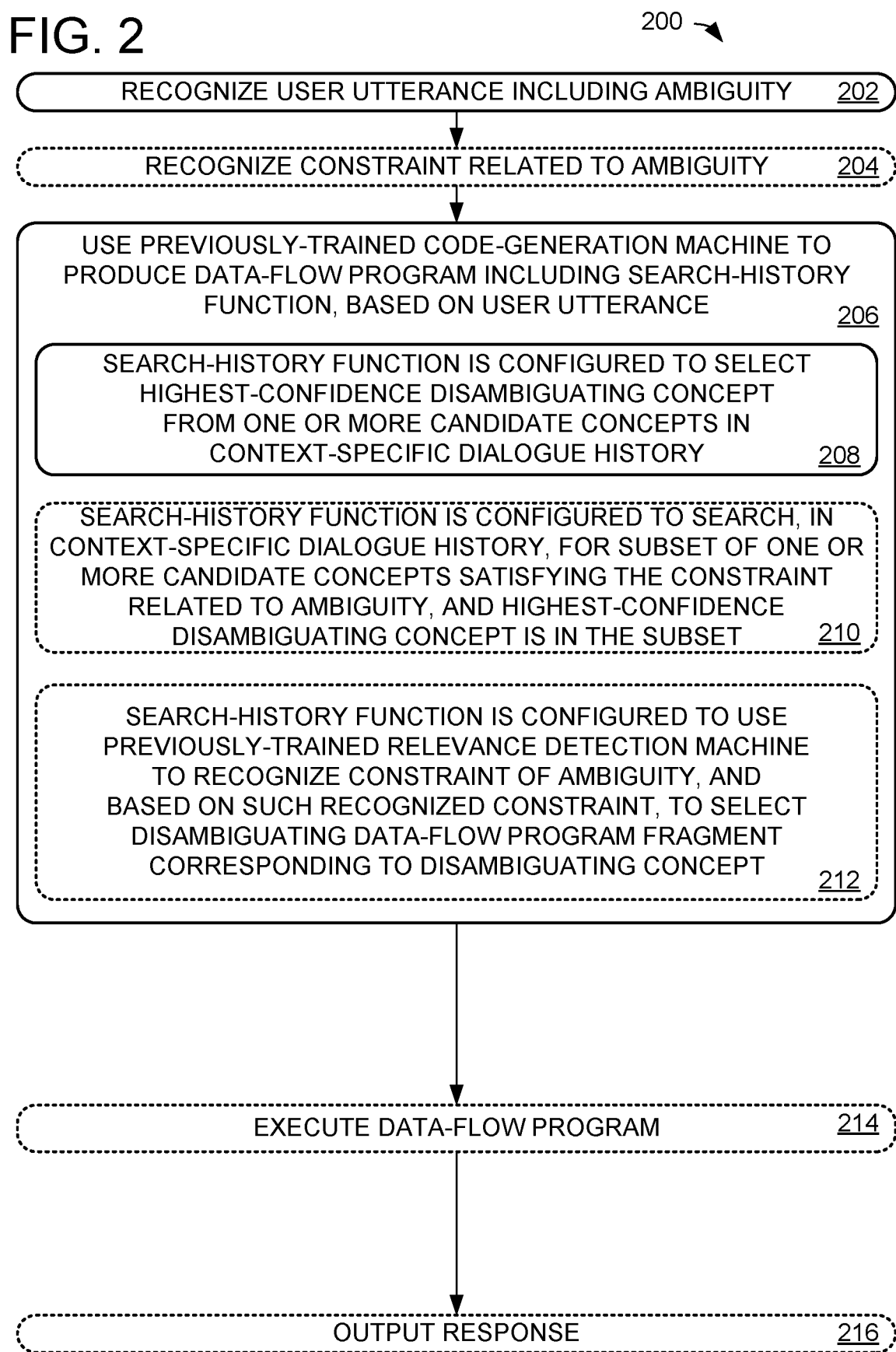
FIG. 2 shows a method of processing a user utterance including an ambiguity.

FIG. 2 shows an exemplary method 200 for processing a user utterance that includes an ambiguity. The method resolves the ambiguity with information in a context-specific dialogue history using a search-history function. As shown in FIG. 3A, the context-specific dialogue history may include any suitable information tracked for a dialogue, such as a concept 334 indicating a previous user utterance 304, and a concept 324 indicating a previously-executed data-flow program fragment 326.

At 202, method 200 includes recognizing the user utterance including the ambiguity. For example, FIG. 3A shows an exemplary ambiguous user utterance 302 in which a user asks, "What's after that?". The utterance, by itself, does not give sufficient information to respond to the user, e.g., because "that" does not refer to any particular event without further context.

In some examples, at 204, method 200 includes recognizing a constraint related to the ambiguity. For example, returning to FIG. 3A, the utterance includes the words "after that," and accordingly method 200 includes recognizing a constraint that the user is referring to a relevant time. For example, the previously-trained code generation machine may be trained on one or more training examples in which a user utterance includes time-related words such as "after" when the user is referring to a time. For example, the time may be a start time defined by a schedule for a scheduled event, such as an event scheduled in the user's calendar.

Accordingly, returning briefly to FIG. 2, at 206, method 200 includes using the previously-trained code-generation machine to produce a data-flow program for responding to the user utterance, wherein the data-flow program includes the search-history function, which is called "getSalient" in the exemplary syntax shown in FIG. 3A. The search-history function may be executed to lookup relevant information from the context-specific dialogue history in order to resolve the ambiguity. As described at 208, the search-history function is configured to select a highest-confidence disambiguating concept from one or more concepts in the context-specific dialogue history, in order to use that highest-confidence disambiguating concept to resolve the ambiguity.

For example, in FIG. 3A, after the user talked about the meeting with Tom Jones, context-specific dialogue history 130 includes a concept 334 including a previous user utterance 304 in which the user asked "When is my next meeting with Tom Jones?" and a concept 324 defined by a data-flow program fragment 326 that was previously executed (e.g., data-flow program 106' as shown in FIG. 1E) in response to the previous user utterance 304. The data-flow program 322 is configured to determine a particular event (e.g., the next meeting with Tom), determine a start time for the event, and describe the time. Accordingly, the search-history function "getSalient" is configured to search for a relevant time from the context-specific dialogue history, in order to use the relevant time for finding events occurring after that time and to output response 330 indicating what events occur after that time. The relevant time may be the [time] value defined in data-flow program 326 pertaining to the meeting with Tom. Accordingly, the response 330 indicates that after the meeting with Tom, there is another meeting with Richard Brown.

Returning to FIG. 2, in some examples, as described at 210, the search-history function is configured to search, in the context-specific dialogue history, for a subset of one or more candidate concepts that satisfy the constraint related to the ambiguity, wherein the highest-confidence disambiguating concept is found within that subset. For example, in FIG. 3A, based on the utterance 302 including the words "after that," the recognized constraint may include the constraint that the user is referring to a relevant time defined by the schedule for a scheduled event (as described above), so relevant concepts from the context-specific dialogue history 130 should be "time" type values. Accordingly, the search-history function "getSalient(Time( ))" is configured to search for a subset of relevant values having a "time" type from the context-specific dialogue history 130, e.g., including the [time] value.

In some examples, as described at 212, the search-history function is configured to use a previously-trained relevance detection machine to recognize the constraint of the ambiguity, and based on such recognized constraint, to select a disambiguating data-flow program fragment corresponding to the disambiguating concept. For example, as shown in FIG. 3A, the data-flow program fragment 326 may be selected to use for disambiguation, based on the "time" type constraint. The previously-trained relevance detection machine may include any suitable combination of state-of-the-art and/or future ML, AI, and/or NLP technologies.

In some examples, the previously-trained relevance detection machine may be trained via supervised training on a plurality of annotated dialogue histories, wherein an annotated dialogue history includes an unresolved search-history function labeled with a disambiguating concept that would resolve the unresolved search-history function. Accordingly, the previously-trained relevance detection machine may be trained to predict a suitable disambiguating concept, given an unresolved search-history function. For example, an annotated dialogue history may include a data-flow program fragment that uses the search-history function (e.g., data-flow program 322 including "getSalient") and an exemplary disambiguating concept that would resolve the ambiguity (e.g., concept 324 including data-flow program fragment 326 which defines [time]=[events][0].start).

In some examples, annotated dialogue histories may be provided by human demonstrators, who may be shown an ambiguous user utterance and a corresponding data-flow program including the search-history function, and asked to provide an exemplary data-flow program fragment that is an appropriate match for the search-history function in the context of the ambiguous user utterance. In some examples, the disambiguating concept that would resolve the unresolved search-history function is selected by a human demonstrator from the context-specific dialogue history. In some examples, the disambiguating concept is an exemplary data-flow program fragment received from the human demonstrator. For example, the human demonstrator may be asked to provide the data-flow program fragment by composing one or more of the pre-defined composable functions and/or one or more data-flow program fragments from the context-specific dialogue history. For example, the human demonstrator may be asked to use a graphical user interface (GUI) to select one or more disambiguating concepts from the context-specific dialogue history, and/or to compose new programs using such concepts and pre-defined composable functions selectable from a menu. In some examples, the disambiguating concept is unrelated to the context-specific dialogue history, for example, a human demonstrator may indicate that a salient date for resolving a search-history function constrained to look for dates is "today," regardless of concepts in the context-specific dialogue history.

After producing the data-flow program including the search-history function, at 214 method 200 optionally further includes executing the data-flow program. Accordingly, at 216 method 200 optionally further includes outputting a response resulting from executing the data-flow program. For example, as shown in FIG. 3A, the data-flow program 322 may be executed, including executing the search-history function to search for a salient "time" type value from the history to determine the value [time2], and to find events starting after [time2] (e.g., by invoking an API to access the user's calendar). Accordingly, a response 330 may be output, to tell the user that "After the meeting with Tom, you have a meeting with Richard Brown, starting at 1:30."

Figure 3B:
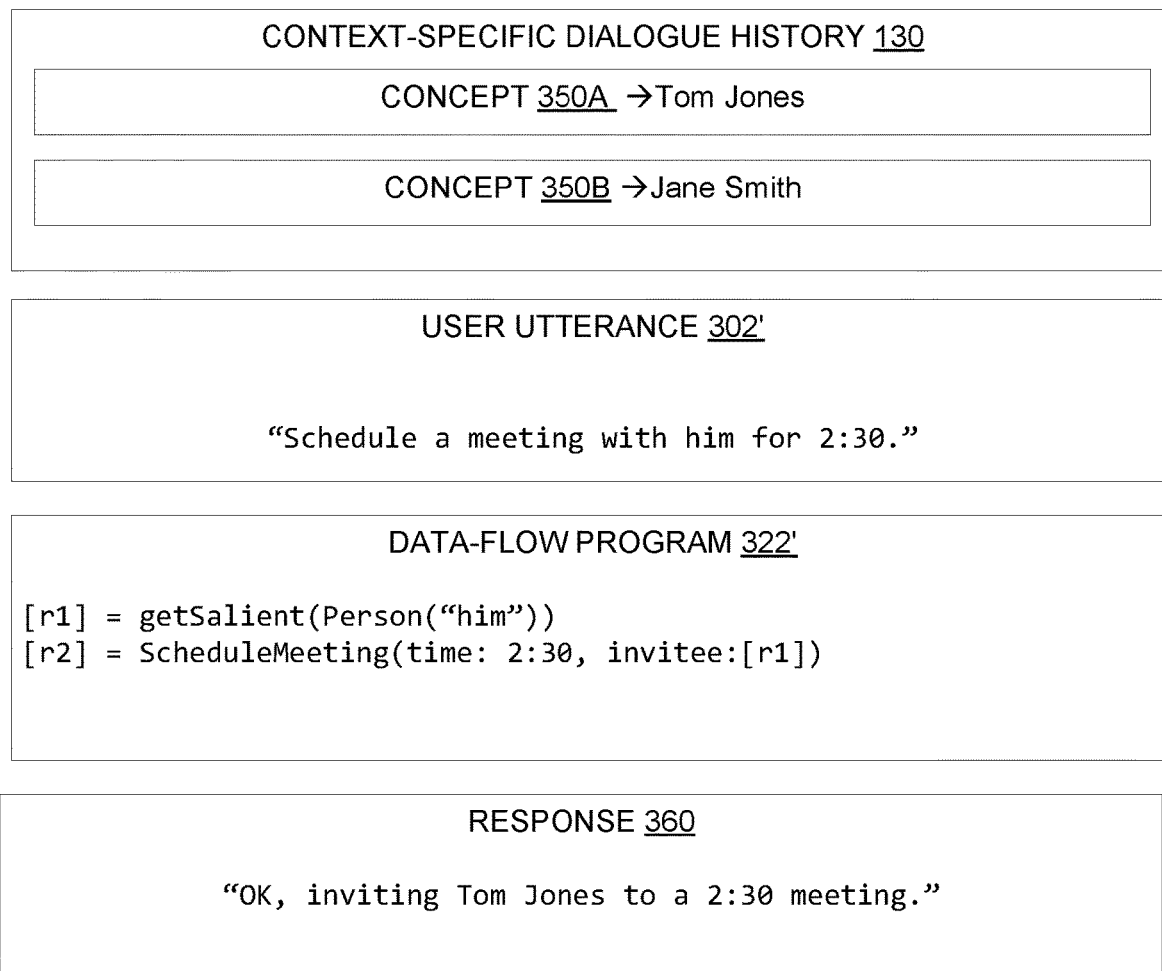

FIGS. 3B-3C show further examples of resolving user utterances including ambiguities. As shown in FIG. 3B, in some examples, a constraint for the ambiguity indicates an ambiguous entity and an entity property of the ambiguous entity, and the subset of the one or more candidate concepts includes only those candidate entities from the context-specific dialogue history having the entity property. As an example, in user utterance 302', the user asks to "schedule a meeting with him for 2:30." The descriptor "him" may be ambiguous without further context, since it could refer to any person who uses the male pronoun "him." However, context-specific dialogue history 130 includes potentially relevant entities including Tom Jones indicated by concept 350A and Jane Smith indicated by concept 350B. As described above (and not shown in detail here), the concept 350A and concept 350B may be represented in any suitable form, e.g., concept 350A may correspond to a data-flow program fragment for looking up a person named "Tom Jones" by name using an API for accessing the user's address book. Based on the user utterance, the data-flow program 322' is configured to find a salient person based on the property of having a male pronoun ("him"). Accordingly, if the history includes relevant entities "Tom Jones" and "Jane Smith," and "Tom Jones" uses male pronouns whereas "Jane Smith" uses female pronouns, then the search-history function ("getSalient") may find the more relevant entity "Tom Jones." Accordingly, response 360 indicates that the meeting was scheduled for 2:30 and Tom Jones is being invited.

In some examples, as shown in FIG. 3C, the constraint indicates an ambiguous reference to an action performed by the automated assistant and a constraining property related to the action. Accordingly, the subset of the one or more candidate concepts includes a plurality of candidate actions having the constraining property, wherein each candidate action is defined by a candidate data-flow program fragment. For example, user utterance 302" indicates that the user wishes to invite "Jane" instead, but it is ambiguous from the user utterance 302" what event to invite Jane to. Accordingly, the constraining property related to the action is that the action is related to inviting a person to an event. Accordingly, there may be a relevant action performed by the automated assistant, stored as a concept 306 in the context-specific dialogue history 130. As shown, the concept 306 includes a data-flow program 308 corresponding to actions performed by the assistant, e.g., the code corresponding to the meeting set up in the interaction shown in FIG. 3B. The data-flow program 308 for resolving the ambiguity is configured to use the search-history function ("getSalient") to search for a relevant event.

In some examples, a concept indicated by a user in a user utterance may be indicated based on extrinsic and/or situational properties, and/or based on the provenance of the concept within a conversation between the user and the automated assistant. As an example, a user utterance may refer to a meeting event by referring to "the second meeting," which may refer to a meeting via extrinsic and/or situational properties, for example the second meeting on the user's schedule. Alternately or additionally, "the second meeting" may refer to the second meeting discussed in the conversation between the user and the automated assistant. The code-generation machine may be configured, as a result of the supervised training herein, to appropriately recognize from context what a user refers to using phrases such as, "the second meeting."

In some examples, also as shown in FIG. 3C, the data-flow program 322" includes a program-rewriting function (named "Clobber" in the exemplary syntax) parametrized by a designated concept ("[designated]") stored in the context-specific dialogue history and configured to generate a new data-flow program fragment related to the designated concept based on concepts from context-specific dialogue history 130 (e.g., to write a new program for performing a previous action with regard to a new entity). In some examples, the designated concept ("[designated]", namely the scheduling of the new meeting with Tom Jones) includes a target sub-concept ("replacementTarget", namely the invitee of the event, Tom Jones). Accordingly, the program-rewriting function is further parametrized by a replacing sub-concept for replacing the target sub-concept, namely "[replacing]" indicating the new invitee for the meeting, Jane. Accordingly, the new data-flow program fragment corresponds to the designated concept with the target sub-concept being replaced by the replacing sub-concept. In other words, the program-rewriting function results in a new data-flow program configured to invite Jane Smith to the same event that was previously set up with Tom Jones. In particular, in some examples, the new data-flow program fragment includes a rewritten data-flow program fragment, based on a historical data-flow program fragment corresponding to the designated concept, wherein a sub-program fragment corresponding to the target sub-concept is replaced by a different sub-program fragment corresponding to the replacing sub-concept.

The program-rewriting function may be parametrized in any suitable fashion. For example, the designated concept, replacement target sub-concept, and replacing sub-concept may be derived from the context-specific dialogue history 130 (e.g., the alternate program fragment 180 may be a previously-executed program fragment), built from the plurality of pre-defined functions 110 and/or output by the previously-trained code-generation machine 104. For example, previously-trained code-generation machine 104 may be trained with regard to one or more training examples including an exemplary program-rewriting function, and an exemplary data-flow program fragment for each parameter of the program-rewriting function. In some examples, previously-trained code-generation machine is trained with regard to a large plurality of different training examples including program-rewriting functions.

In the examples above, the user utterances were processed using the context-specific dialogue history, resulting in outputting an automated assistant response. However, in some examples, an error may occur during processing of a user utterance. Nevertheless, data-flow programs according to the present disclosure may be configured for unconditional evaluation of one or more data values including a return value. Accordingly, processing a data-flow program may include executing the data-flow program in order to obtain the return value. However, although the data-flow programs may be configured for unconditional evaluation of the data values including the return value, errors may occur during processing of the data-flow program, for example due to an ambiguity in a user utterance that precludes fully resolving a data-flow program based on the user utterance. Accordingly, responsive to detecting any error condition while executing the data-flow program, execution of the data-flow program may be suspended. After suspending execution of the data-flow program, the previously-trained code generation machine may be used to generate an alternate, error-handling data-flow program based on the suspended execution of the data-flow program. Accordingly, the alternate, error-handling data-flow program may be executed in order to recover from the error condition.

Figure 4:
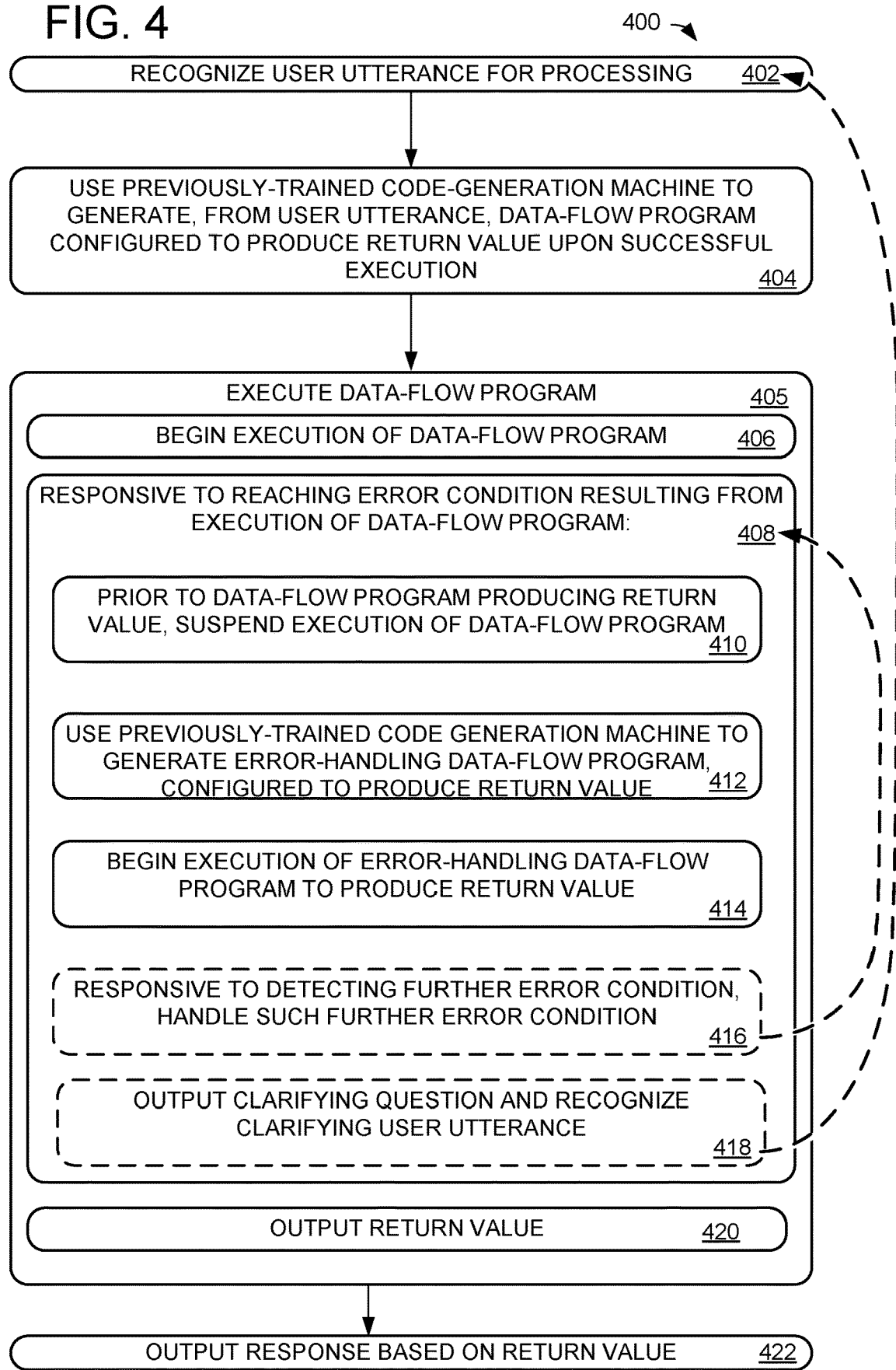
FIG. 4 shows a method of handling errors during the processing of a user utterance.

FIG. 4 shows an exemplary method 400 for processing a user utterance by an automated assistant, when an error may occur during such processing. At 402, method 400 includes recognizing a user utterance for processing. For example, FIG. 5A shows an exemplary dialogue including user utterance 502 in which the user asks, "Who is Dan's manager?". As in previous examples, while processing the user utterance the automated assistant maintains a context-specific dialogue history 130, which is used to track concepts related to previous interactions between the user and the automated assistant, e.g., concepts 540A, 540B, and 540C which are not shown in detail in the present example.

At 404, method 400 includes using a previously-trained code-generation machine to generate, from the user utterance, a data-flow program (e.g., data-flow program 522 shown in FIG. 5A). The data-flow program is configured to produce a return value upon successful execution, e.g., to return a description of Dan's manager. Accordingly, the data-flow program includes computing a first value [r1] which is configured as a list of all of the relevant people with a name like "Dan," where the list of results is expected to be a singleton list including exactly one entry, e.g., a unique result for people with a name like "Dan." Assuming the single person named "Dan" is found and saved as [r1], the data-flow program further includes computing another value [r2] by finding the manager of [r1], and describing the result.

At 405, method 400 includes executing the data-flow program. Accordingly, at 406, method 400 includes beginning execution of the data-flow program. Returning briefly to FIG. 5A, evaluating [r1] includes searching for a person named "Dan," for example by accessing context-specific dialogue history 130 and/or accessing an address book of the user. However, when evaluating [r1], an error condition 532 is reached because there is more than one person with a name like "Dan," namely "Dan A" and "Dan B," so the list of people with a name like "Dan" is not a singleton. Accordingly, this discrepancy is detected as the error condition 532 which includes a data-flow program fragment describing an event in which the error condition is detected. The error event indicates that the error is due to ambiguity.

At 408, responsive to reaching an error condition resulting from execution of the data-flow program, method 400 includes handling the error condition. Handling the error condition includes, at 410, prior to the data-flow program producing the return value, suspending execution of the data-flow program (e.g., data-flow program 522 as shown in FIG. 5A), before computing and describing the return value (e.g., return value [r2]). In order to resolve the error condition (e.g., error condition 532), the automated assistant is configured to describe the error, e.g., so as to obtain disambiguating information from the user. Accordingly, optionally at 418, handling the error condition may include outputting a clarifying question and recognizing a clarifying user utterance, e.g., by looping back to 402 to recognize a further user utterance. As shown in FIG. 5A, the automated assistant outputs a response 534 including a clarifying question, "Did you mean Dan A or Dan B?"

Turning now to FIG. 5B, after suspending execution of the data-flow program and outputting the response including the clarifying question, the automated assistant may receive a subsequent user utterance to obtain disambiguating information for handling the error. Accordingly, the erroneous data-flow program 522 and the error condition 532 are saved as concept 520 and concept 530 (respectively) in the context-specific dialogue history, while a new user utterance 502' indicating "Dan A" is processed.

Accordingly, at 412, method 400 further includes using the previously-trained code-generation machine to generate an error-handling data-flow program, wherein the error-handling data-flow program 552 is configured to produce the return value (e.g., the error-handling data-flow program 552 is an alternate means of computing the expected value corresponding to [r2]).

In some examples, reaching the error condition includes detecting an error when executing a problematic program fragment of the data-flow program, for example, the error condition shown in FIG. 5A arises when evaluating the problematic program fragment defining the [r1] value, namely "Find(Person(name: like("Dan"))).results.singleton( )". Accordingly, generating the error-handing data-flow program includes outputting a new data-flow program based on the problematic program fragment [r1]. As shown in the example, error-handing data-flow program 552 uses the search-history function ("getSalient") to find a relevant person named "Dan A," saving the result as [r3]. In some examples, data-flow programs may include an "intensionOf" function configured to return an "intension," which refers herein to a reference to a data-flow program fragment. The error-handling data-flow program 552 uses the data-flow program fragment corresponding to the [error] event, namely "intensionOf[r1]" as defined in the data-flow program fragment of error condition 532.

As shown in FIG. 5B, the new data-flow program based on the problematic program fragment includes a program-rewriting function (e.g., "Clobber") configured to replace, in the data-flow program, the problematic program fragment with an alternate program fragment. The error-handling data flow program 552 defines a new computation [newComp1] by using the program-rewriting function ("Clobber") to rewrite the original return value [r2] by replacing a target sub-concept defined by [r4], namely the problematic program fragment that resulted in the error, with a different sub-concept [r3].

In some examples, as shown in FIG. 5B, the alternate program fragment includes a search-history function configured to search, in the context-specific dialogue history, for the alternate program fragment based on a relationship to the problematic program fragment. Accordingly, the sub-concept [r3] is defined by code for finding a relevant person named "Dan A" using the search-history function.

At 414, method 400 includes beginning execution of the error-handling data-flow program to produce a return value. For example, the error-handling data-flow program 522 is configured to return value [r2'] by executing the new computation [newComp1]. At 420, method 400 includes outputting the return value. After outputting a return value, at 422, method 400 further includes outputting a response based on the return value, e.g., FIG. 5B shows a response 514 saying that "Dan's manager is Tom Jones."

In some examples, execution of a data-flow program may lead to reaching more than one different error condition. For example, after reaching and fully resolving a first error condition, another error condition may be reached. Alternately or additionally, the automated assistant may be configured to detect more than one simultaneous error condition and handle any such error conditions simultaneously by generating an error-handling data-flow program with regard to all such error conditions.

In some examples, method 400 includes recognizing a further error during execution of the error-handling data-flow program, and executing an error-recovery loop including producing and executing further error-handling data-flow programs, until one of the further error-handling data-flow programs produces the return value. Accordingly, handling an error condition responsive to reaching the error condition at 408 includes, responsive to detecting a further error condition at 416, returning to 408 to handle such further error condition. Any number of errors may be resolved sequentially and/or simultaneously by detecting each error in turn, and generating an error-handling data-flow program to recover from the error(s).

FIG. 5C shows an example where two different error conditions are handled. FIG. 5C is shown as a series of user utterances and responses, and the context-specific dialogue history and data-flow programs pertaining to the utterances/responses are not shown. In the first user utterance 504, the user asks to schedule a meeting with Dan and Tom. However, there may be more than one relevant Dan and similarly, more than one relevant Tom. Accordingly, in a manner similar to shown in FIGS. 5A-5B, the automated assistant is configured to output a response 534' asking which Dan the user wants to schedule a meeting with. The user responds in a user utterance 506 that they meant "Dan A." The automated assistant is configured to output a subsequent response 536 asking which Tom the user wants to schedule a meeting with. The user responds in a user utterance 508 that they meant "Tom J." Accordingly, after "Dan" and "Tom" are disambiguated, the automated assistant is configured to schedule the meeting and to output a response 538 indicating that the meeting has been scheduled.

In some examples, as shown in FIG. 5D, responsive to a user utterance 510, the data-flow program generated by the previously-trained code generation machine designates a concept for resolution using a search-history function, namely finding a person [r1] by searching for a salient match for "him" mentioned in user utterance 510. However, the search-history function may find two or more relevant concepts, as indicated by the error conditions 534". For example, context-specific dialogue history 130 may include a concept 530A corresponding to "Dan A" and another concept 530B corresponding to "Tom J." For example, the concept corresponding to "Dan A" may be defined by a data-flow program fragment such as the fragment "[r2']=Execute([newComp1])" defined in the error-recovery data-flow program shown in FIG. 5B, or by any other suitable data-flow program fragment such as "[r3]=getSalient(Person (name: like ("Dan A")))", and the concept corresponding to "Tom J" may be defined similarly. Accordingly, the automated assistant is configured to output a response 536" including a clarifying question asking the user to provide a clarifying response indicating one of the two or more relevant concepts (e.g., namely to indicate "Dan A" or "Tom J"). The error-handling data-flow program is further configured to receive a clarifying user utterance 512, and to resolve the ambiguity based on the clarifying utterance. Accordingly, after resolving that the user was referring to "Dan A" in the original user utterance 510, the automated assistant is configured to perform the action [r2] to dial the phone number for "Dan A" and to output a response 538''' describing this action.

In some examples, as shown in FIG. 5E, the error is an ambiguity wherein the data-flow program designates a concept for resolution using a search-history function, the search-history function finds zero relevant concepts, and the error-handling data-flow program is executable to output a clarifying question asking the user to provide a clarifying response indicating a relevant concept, to receive a clarifying user utterance, and to resolve the ambiguity based on the clarifying utterance. For example, in FIG. 5E the user asks in user utterance 524 to "call him to confirm the meeting." A resulting data-flow program 526 is executable to find a relevant person and call that person. However, the context-specific dialogue history 130 may not contain any concept corresponding to a relevant person (e.g., because no male people have been discussed recently). Accordingly, error condition 534''' indicates that no match is found for finding a salient person to compute [r1]. Accordingly, the automated assistant is configured to execute an error-handling data-flow program (not shown), which includes getting a clarifying response 582 to figure out who to call and calling that person (e.g., by using the program-rewriting function to create a new computation based on [r1] and/or [r2], similar to the example shown in FIGS. 5A-5B). After the user clarifies that they meant "Dan A" in user utterance 516, the error-handing data-flow program 552 is configured to dial "Dan A"'s phone number in order to complete the same steps as the original data-flow program 522, with regard to the clarification provided by the user. Accordingly, the data-flow program is configured to output a response 584 indicating that the call is being dialed.

In some examples, as shown in FIG. 5F, the error is a lack of confirmation wherein the data-flow program designates an action to be performed only after receiving a user confirmation response and the user utterance does not include such user confirmation response, and the error-handling data-flow program is executable to output a confirmation question asking the user to provide the user confirmation response before performing the action. For example, the user asks in user utterance 518 to schedule a ride to the meeting. The data-flow program 562 is able to find a salient meeting and determine that there is a ride available to get to the meeting now, storing a resulting value in [r2]. For example, [r2] may include any suitable information related to scheduling the ride, such as a resource descriptor issued by a ride-hailing service API. The data-flow program 562 is configured to schedule a ride based on the resulting value, but only after getting confirmation from the user. The lack of confirmation may be detected as an error condition 554. Accordingly, an error-handling data-flow program (not shown) may be configured to output a response 556 indicating a cost of the ride and asking the user for confirmation. In user utterance 520, the user indicates that they do want to schedule the ride. Accordingly, the error-handling data-flow program may proceed to schedule the ride, for example, by re-executing the computation [r3], and to output a response 558 indicating that the action was performed.

In some examples, the error-handling mechanism described herein may be utilized to determine information that is needed for handling a user utterance, by asking the user one or more follow-up questions. For example, if a user utterance includes a request to perform a certain action that is parametrized by one or more constraints, and the user utterance specifies some, but not all of the constraint values for specifying the constraints, the action may not be performed before specifying the remaining constraints. Accordingly, the missing constraint parameters may be detected as an error and accordingly, the previously-trained code-generation machine is configured to output an error-handling data-flow program. For example, the error-handling data flow program may be executable to ask questions to direct the user to provide further information for specifying the remaining constraints, and to perform the requested action using such further information received from the user. Alternately or additionally, the error-handling data flow program may be executable to specify one or more of the remaining constraints with a default value. As an example, if a user asks to "Schedule a meeting with Charles next Thursday at 10 AM," a resulting data-flow program may be configured to perform a meeting-scheduling that is parametrized by the date, time, invitees, and duration. Since the user utterance mentions "Charles," "Thursday," and "10 AM," the constraints for the date, time, and invitees may be specified. However, the constraint for the duration may be unspecified, resulting in an error condition. Accordingly, the previously-trained code generation machine may be configured to output an error-handling data-flow program to specify the remaining constraint for the duration. The error-handling data-flow program may be configured to ask the user a follow-up question, "how long should the meeting be?" in order to get another user utterance from which the meeting duration may be determined. Alternately, the error-handling data-flow program may be configured to determine a default value for specifying the constraint, for example, a default meeting duration of 30 minutes. Default values may be determined by the code-generation machine based on supervised training on exemplary default values, by using the search-history function, using any other intelligent-decision function, using a user-customized function (e.g., to access the user's default meeting duration preference), or in any other suitable manner. In some examples, an action defined by a data-flow program is implemented using an API inference function, which may be parametrized by one or more constraints. Accordingly, if any such parameters are not defined by a user utterance, some or all of the parameters may be inferred by running a constraint satisfaction program. For example, for an API inference function for scheduling meetings that requires a meeting start time and a meeting end time, the meeting end time may be inferred based on the meeting start time and duration. Similarly, the meeting start time may be inferred based on the meeting end time and duration. Accordingly, error-handing data-flow programs may be configured to infer as many constraints as possible for API inference functions, before asking questions, assuming default values, or otherwise handling missing constraints. In some examples, instead of generating a single default value for specifying a constraint, an error-handling data flow program may be configured to generate a plurality of different candidate values for specifying the constraint and ask the user to select a particular candidate value. In some examples, the error-handling data flow program may use the plurality of different candidate values to parametrize and execute a plurality of different API calls (e.g., using API inference functions) and ask the user to select a candidate value based on results of the API calls. For example, the error-handling data flow program may attempt to schedule multiple different meetings with different durations and ask the user to select one of the resulting schedules. In some examples, the error-handling data flow program may filter the candidate options based on results of the API calls, e.g., attempting to schedule multiple different meetings with different durations and asking the user to choose between meetings that do not result in a scheduling conflict, while omitting candidates with a duration that would result in a scheduling conflict as indicated by a meeting-scheduling API.

In some examples, the alternate program fragment is output by the previously-trained code-generation machine. Accordingly, the previously-trained code-generation machine may be trained to output the alternate program fragment with supervised training based on a plurality of training examples, wherein a training example includes an exemplary problematic program fragment that would cause an error condition, and a resolving alternate program fragment that would not cause the error condition. In other words, the previously-trained code generation machine may be trained in similar fashion with regard to generating code for a user utterance, as well as with regard to generating code to respond to an error. In either case, the previously-trained code generation machine is configured to generate programs using a plurality of pre-defined, composable functions, arranged in any suitable sequence for processing the user utterance and/or error. In some examples, the previously-trained code-generation machine is trained with regard to a large plurality of training examples in which an error condition was reached and in which an alternate program fragment is executable to recover from the error, for example by successfully yielding a return value.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
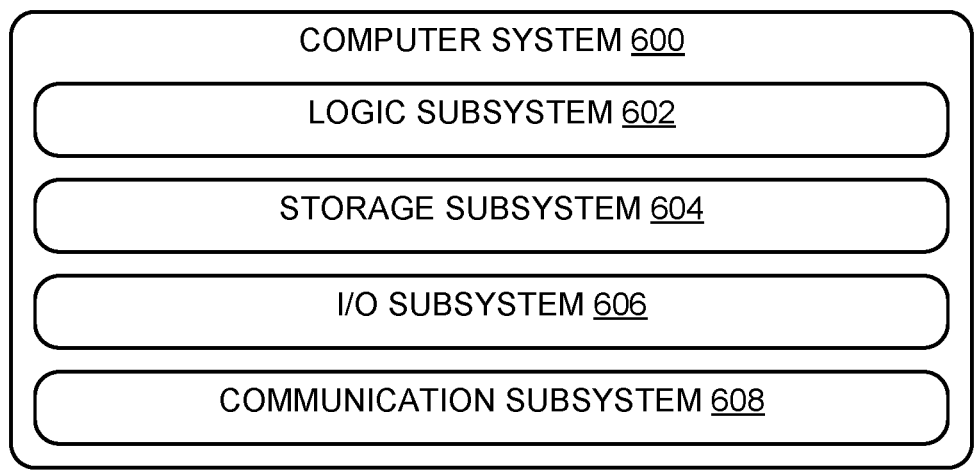
FIG. 6 shows an exemplary computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 600 includes a logic subsystem 602 and a storage subsystem 604. Computing system 600 may optionally include an input/output subsystem 606, communication subsystem 608, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices. For example, the previously-trained code-generation machine, previously-trained relevance detection machine, and/or error-handling execution machine are examples of machines according to the present disclosure.

Machines may be implemented using any suitable combination of state-of-the-art and/or future machine learning (ML), artificial intelligence (AI), and/or natural language processing (NLP) techniques. For example, the previously-trained code-generation machine and/or previously-trained relevance detection machine may incorporate any suitable ML, AT, and/or NLP techniques, including any suitable language models.

Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

The previously-trained code-generation machine and/or previously-trained relevance detection machine may incorporate any suitable language models. Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech.

The language model may be used in conjunction with an acoustical model configured to assess, for a candidate word and an audio signal, a confidence that the candidate word is included in speech in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech and corrected text, in order to learn the mapping between the speech signals and sound units denoted by the corrected text. Accordingly, the acoustical model may be continually improved to improve its utility for correctly recognizing speech.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech and/or other words recognized so far. Accordingly, the graphical model may utilize the statistical features, previously trained machine learning models, and/or acoustical models to define transition probabilities between states represented in the graphical model.

When included, input/output subsystem 606 may comprise one or more displays, which may be used to present a visual representation of data held by storage subsystem 604. This visual representation may take the form of a graphical user interface (GUI). Input/output subsystem 606 may include one or more display devices utilizing virtually any type of technology. In some implementations, display subsystem may include one or more virtual-, augmented-, or mixed reality displays. When included, input/output subsystem 606 may further comprise one or more speakers configured to output speech, e.g., to present an audible representation of data held by storage subsystem 604, such as automated assistant responses.

When included, input/output subsystem 606 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 608 may be configured to communicatively couple computing system 600 with one or more other computing devices. Communication subsystem 608 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method comprises: recognizing a user utterance for processing by an automated assistant; using a previously-trained code-generation machine to generate, from the user utterance, a data-flow program configured to produce a return value upon successful execution; beginning execution of the data-flow program; responsive to reaching an error condition resulting from execution of the data-flow program: prior to the data-flow program producing the return value, suspending execution of the data flow program; using the previously-trained code-generation machine to generate an error-handling data-flow program, wherein the error-handling data-flow program is configured to produce the return value; beginning execution of the error-handling data-flow program to produce the return value; and outputting the return value. In this or any other example, reaching the error condition includes detecting an error when executing a problematic program fragment of the data-flow program, and wherein generating the error-handling data-flow program includes outputting a new data-flow program based on the problematic program fragment. In this or any other example, the new data-flow program based on the problematic program fragment includes a program rewriting function configured to replace, in the data-flow program, the problematic program fragment with an alternate program fragment. In this or any other example, the method further comprises maintaining a context-specific dialogue history, wherein the alternate program fragment is a search-history function configured to search, in the context-specific dialogue history, for the alternate program fragment based on a relationship to the problematic program fragment. In this or any other example, the alternate program fragment is output by the previously-trained code-generation machine, and wherein the previously-trained code-generation machine is trained to output the alternate program fragment with supervised training based on a plurality of training examples, wherein a training example includes an exemplary problematic program fragment that would cause an error condition, and a resolving alternate program fragment that would not cause the error condition. In this or any other example, the method further comprises recognizing a further error during execution of the error-handing data-flow program, and executing an error-recovery loop including producing and executing further error-handing data-flow programs, until one of the further error-handling data-flow programs produces the return value. In this or any other example, the error is an ambiguity wherein the data-flow program designates a concept for resolution using a search-history function, the search-history function finds two or more relevant concepts, and the error-handling data-flow program is executable to: output a clarifying question asking the user to provide a clarifying response indicating one of the two or more relevant concepts, receive a clarifying user utterance, and resolve the ambiguity based on the clarifying utterance. In this or any other example, the error is an ambiguity wherein the data-flow program designates a concept for resolution using a search-history function, the search-history function finds zero relevant concepts, and the error-handling data-flow program is executable to: output a clarifying question asking the user to provide a clarifying response indicating a relevant concept, receive a clarifying user utterance, and resolve the ambiguity based on the clarifying utterance. In this or any other example, the error is a lack of confirmation wherein the data-flow program designates an action to be performed only after receiving a user confirmation response and the user utterance does not include such user confirmation response, and the error-handling data-flow program is executable to output a confirmation question asking the user to provide the user confirmation response before performing the action.

In an example, an automated assistant system comprises: a microphone; a speaker; a logic subsystem; and a storage subsystem holding instructions executable by the logic subsystem to: recognize a user utterance for processing by an automated assistant; use a previously-trained code-generation machine to generate, from the user utterance, a data-flow program configured to produce a return value upon successful execution; begin execution of the data-flow program; responsive to reaching an error condition resulting from execution of the data-flow program: prior to the data-flow program producing the return value, suspend execution of the data flow program; use the previously-trained code-generation machine to generate an error-handling data-flow program, wherein the error-handling data-flow program is configured to produce the return value; begin execution of the error-handling data-flow program to produce the return value; and output the return value. In this or any other example, reaching the error condition includes detecting an error when executing a problematic program fragment of the data-flow program, and wherein generating the error-handling data-flow program includes outputting a new data-flow program based on the problematic program fragment. In this or any other example, the new data-flow program based on the problematic program fragment includes a program rewriting function configured to replace, in the data-flow program, the problematic program fragment with an alternate program fragment. In this or any other example, the instructions are further executable to maintain a context-specific dialogue history, wherein the alternate program fragment is a search-history function configured to search, in the context-specific dialogue history, for the alternate program fragment. In this or any other example, the alternate program fragment is output by the previously-trained code-generation machine, and wherein the previously-trained code-generation machine is trained to output the alternate program fragment with supervised training based on a plurality of training examples, wherein a training example includes an exemplary problematic program fragment that would cause an error condition, and a resolving alternate program fragment that would not cause the error condition. In this or any other example, the instructions are further executable to: recognize a further error during execution of the error-handling data-flow program; and execute an error-recovery loop including producing and executing further error-handling data-flow programs, until one of the further error-handling data-flow programs produces the return value. In this or any other example, the error is an ambiguity wherein the data-flow program designates a concept for resolution using a search-history function, the search-history function finds two or more relevant concepts, and the error-handling data-flow program is executable to output a clarifying question via the speaker, as speech audio asking the user to provide a clarifying response indicating one of the two or more relevant concepts, to receive a clarifying user utterance from the microphone, and to resolve the ambiguity based on the clarifying utterance. In this or any other example, the error is an ambiguity wherein the data-flow program designates a concept for resolution using a search-history function, the search-history function finds zero relevant concepts, and the error-handling data-flow program is executable to output a clarifying question via the speaker, as speech audio asking the user to provide a clarifying response indicating a relevant concept, to receive a clarifying user utterance from the microphone, and to resolve the ambiguity based on the clarifying utterance. In this or any other example, the error is a lack of confirmation wherein the data-flow program designates an action to be performed only after receiving a user confirmation response and the user utterance does not include such user confirmation response, and the error-handling data-flow program outputs a confirmation question asking the user to provide the user confirmation response before performing the action. In an example, a method comprises: recognizing a user utterance for processing by an automated assistant; using a previously-trained code-generation machine to generate, from the user utterance, a data-flow program configured to produce a return value upon successful execution; beginning execution of the data-flow program; detecting an error condition when executing a problematic program fragment of the data-flow program; responsive to detecting the error condition: prior to the data-flow program producing the return value, suspending execution of the data flow program; using the previously-trained code-generation machine to generate an error-handling data-flow program based on the problematic program fragment, wherein the error-handling data-flow program includes a program rewriting function configured to replace, in the data-flow program, the problematic program fragment with an alternate program fragment and wherein the error-handling data-flow program is configured to produce the return value; beginning execution of the error-handling data-flow program to produce the return value; and outputting the return value. In this or any other example, the alternate program fragment is output by the previously-trained code-generation machine, and wherein the previously-trained code-generation machine is trained to output the alternate program fragment with supervised training based on a plurality of training examples, wherein a training example includes an exemplary problematic program fragment that would cause an error condition, and a resolving alternate program fragment that would not cause the error condition.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A method, comprising:
   recognizing a user utterance for processing by an automated assistant;
   using a previously-trained code-generation machine to generate, from the user utterance, a data-flow program configured to produce a return value upon successful execution;
   beginning execution of the data-flow program;
   responsive to reaching an error condition resulting from execution of the data-flow program:
   prior to the data-flow program producing the return value, suspending execution of the data flow program;
   using the previously-trained code-generation machine to generate an error-handling data-flow program, wherein the error-handling data-flow program is configured to produce the return value;
   beginning execution of the error-handling data-flow program to produce the return value; and
   outputting the return value.

2. The method of claim 1, wherein reaching the error condition includes detecting an error when executing a problematic program fragment of the data-flow program, and wherein generating the error-handling data-flow program includes outputting a new data-flow program based on the problematic program fragment.

3. The method of claim 2, wherein the new data-flow program based on the problematic program fragment includes a program rewriting function configured to replace, in the data-flow program, the problematic program fragment with an alternate program fragment.

4. The method of claim 3, further comprising maintaining a context-specific dialogue history, wherein the alternate program fragment is a search-history function configured to search, in the context-specific dialogue history, for the alternate program fragment based on a relationship to the problematic program fragment.

5. The method of claim 3, wherein the alternate program fragment is output by the previously-trained code-generation machine, and wherein the previously-trained code-generation machine is trained to output the alternate program fragment with supervised training based on a plurality of training examples, wherein a training example includes an exemplary problematic program fragment that would cause an error condition, and a resolving alternate program fragment that would not cause the error condition.

6. The method of claim 1, further comprising recognizing a further error during execution of the error-handling data-flow program, and executing an error-recovery loop including producing and executing further error-handling data-flow programs, until one of the further error-handling data-flow programs produces the return value.

7. The method of claim 1, wherein the error is an ambiguity wherein the data-flow program designates a concept for resolution using a search-history function, the search-history function finds two or more relevant concepts, and the error-handling data-flow program is executable to:

output a clarifying question asking the user to provide a clarifying response indicating one of the two or more relevant concepts,
receive a clarifying user utterance, and
resolve the ambiguity based on the clarifying utterance.

8. The method of claim 1, wherein the error is an ambiguity wherein the data-flow program designates a concept for resolution using a search-history function, the search-history function finds zero relevant concepts, and the error-handling data-flow program is executable to:
output a clarifying question asking the user to provide a clarifying response indicating a relevant concept,
receive a clarifying user utterance, and
resolve the ambiguity based on the clarifying utterance.

9. The method of claim 1, wherein the error is a lack of confirmation wherein the data-flow program designates an action to be performed only after receiving a user confirmation response and the user utterance does not include such user confirmation response, and the error-handling data-flow program is executable to output a confirmation question asking the user to provide the user confirmation response before performing the action.

10. An automated assistant system, comprising:
a microphone;
a speaker;
a logic subsystem; and
a storage subsystem holding instructions executable by the logic subsystem to:
recognize a user utterance for processing by an automated assistant;
use a previously-trained code-generation machine to generate, from the user utterance, a data-flow program configured to produce a return value upon successful execution;
begin execution of the data-flow program;
responsive to reaching an error condition resulting from execution of the data-flow program:
prior to the data-flow program producing the return value, suspend execution of the data flow program;
use the previously-trained code-generation machine to generate an error-handling data-flow program, wherein the error-handling data-flow program is configured to produce the return value;
begin execution of the error-handling data-flow program to produce the return value; and
output the return value.

11. The automated assistant system of claim 10, wherein reaching the error condition includes detecting an error when executing a problematic program fragment of the data-flow program, and wherein generating the error-handling data-flow program includes outputting a new data-flow program based on the problematic program fragment.

12. The automated assistant system of claim 11, wherein the new data-flow program based on the problematic program fragment includes a program rewriting function configured to replace, in the data-flow program, the problematic program fragment with an alternate program fragment.

13. The automated assistant system of claim 12, wherein the instructions are further executable to maintain a context-specific dialogue history, wherein the alternate program fragment is a search-history function configured to search, in the context-specific dialogue history, for the alternate program fragment based on a relationship to the problematic program fragment.

14. The automated assistant system of claim 12, wherein the alternate program fragment is output by the previously-trained code-generation machine, and wherein the previously-trained code-generation machine is trained to output the alternate program fragment with supervised training based on a plurality of training examples, wherein a training example includes an exemplary problematic program fragment that would cause an error condition, and a resolving alternate program fragment that would not cause the error condition.

15. The automated assistant system of claim 10, wherein the instructions are further executable to:
recognize a further error during execution of the error-handling data-flow program; and
execute an error-recovery loop including producing and executing further error-handling data-flow programs, until one of the further error-handling data-flow programs produces the return value.

16. The automated assistant system of claim 10, wherein the error is an ambiguity wherein the data-flow program designates a concept for resolution using a search-history function, the search-history function finds two or more relevant concepts, and the error-handling data-flow program is executable to output a clarifying question via the speaker, as speech audio asking the user to provide a clarifying response indicating one of the two or more relevant concepts, to receive a clarifying user utterance from the microphone, and to resolve the ambiguity based on the clarifying utterance.

17. The automated assistant system of claim 10, wherein the error is an ambiguity wherein the data-flow program designates a concept for resolution using a search-history function, the search-history function finds zero relevant concepts, and the error-handling data-flow program is executable to output a clarifying question via the speaker, as speech audio asking the user to provide a clarifying response indicating a relevant concept, to receive a clarifying user utterance from the microphone, and to resolve the ambiguity based on the clarifying utterance.

18. The automated assistant system of claim 10, wherein the error is a lack of confirmation wherein the data-flow program designates an action to be performed only after receiving a user confirmation response and the user utterance does not include such user confirmation response, and the error-handling data-flow program outputs a confirmation question asking the user to provide the user confirmation response before performing the action.

19. A method, comprising:
recognizing a user utterance for processing by an automated assistant;
using a previously-trained code-generation machine to generate, from the user utterance, a data-flow program configured to produce a return value upon successful execution;
beginning execution of the data-flow program;
detecting an error condition when executing a problematic program fragment of the data-flow program;
responsive to detecting the error condition:
prior to the data-flow program producing the return value, suspending execution of the data flow program;
using the previously-trained code-generation machine to generate an error-handling data-flow program based on the problematic program fragment, wherein the error-handling data-flow program includes a program rewriting function configured to replace, in the data-flow program, the problematic program fragment with an alternate program fragment and wherein the error-handling data-flow program is configured to produce the return value;
beginning execution of the error-handling data-flow program to produce the return value; and
outputting the return value.

20. The method of claim 19, wherein the alternate program fragment is output by the previously-trained code-generation machine, and wherein the previously-trained code-generation machine is trained to output the alternate program fragment with supervised training based on a plurality of training examples, wherein a training example includes an exemplary problematic program fragment that would cause an error condition, and a resolving alternate program fragment that would not cause the error condition.

* * * * *